(12) United States Patent
Wu et al.

(10) Patent No.: US 12,555,219 B2
(45) Date of Patent: Feb. 17, 2026

(54) PRE-WELDING ADDRESSING METHOD AND SYSTEM

(71) Applicant: Contemporary Amperex Technology (Hong Kong) Limited, Hong Kong (CN)

(72) Inventors: Kai Wu, Ningde (CN); Beining Zhang, Ningde (CN); Ying Wu, Ningde (CN); Wenchong Wang, Ningde (CN); Wenjie Xie, Ningde (CN); Ji Luo, Ningde (CN)

(73) Assignee: Contemporary Amperex Technology (Hong Kong) Limited, Hong Kong (CN)

( * ) Notice: Subject to any disclaimer, the term of this patent is extended or adjusted under 35 U.S.C. 154(b) by 0 days.

(21) Appl. No.: 18/979,669

(22) Filed: Dec. 13, 2024

(65) Prior Publication Data
US 2025/0124561 A1    Apr. 17, 2025

Related U.S. Application Data

(63) Continuation of application No. PCT/CN2023/139490, filed on Dec. 18, 2023.

(30) Foreign Application Priority Data

Oct. 8, 2023    (CN) .......................... 202311289990.0

(51) Int. Cl.
*G06T 7/70*    (2017.01)
*G06T 7/00*    (2017.01)
(Continued)

(52) U.S. Cl.
CPC .............. *G06T 7/0004* (2013.01); *G06T 7/70* (2017.01); *G06T 2207/30108* (2013.01); *H04N 23/695* (2023.01)

(58) Field of Classification Search
CPC .................................. G06T 7/70; G06V 10/44
(Continued)

(56) References Cited

U.S. PATENT DOCUMENTS

| | | |
|---|---|---|
| 4,687,980 A | 8/1987 | Phillips et al. |
| 12,420,357 B2 * | 9/2025 | Kohll ..................... H01M 10/54 |

(Continued)

FOREIGN PATENT DOCUMENTS

| | | |
|---|---|---|
| CA | 1198797 A | 12/1985 |
| CN | 105215543 A | 1/2016 |

(Continued)

OTHER PUBLICATIONS

International Search Report and Written Opinion of ISA received in the counterpart international application PCT/CN2023/139490, mailed on Jul. 1, 2024.

(Continued)

*Primary Examiner* — Daquan Zhao
(74) *Attorney, Agent, or Firm* — K&L Gates LLP

(57) ABSTRACT

Embodiments of the present disclosure provide a pre-welding addressing method and system. The pre-welding addressing method includes: obtaining product information of a to-be-addressed battery pack, in response to the battery pack getting in position, where the battery pack includes a plurality of cells, and the product information includes initial addressing coordinates of a plurality of cell terminal posts; obtaining positioning deviation values of the plurality of cell terminal posts based respectively on the initial addressing coordinates of the plurality of cell terminal posts, where the positioning deviation values of the cell terminal posts are determined based on addressing images of the cell terminal posts that are acquired by an addressing camera module; and determining target addressing coordinates of the plurality of cell terminal posts based respectively on the (Continued)

initial addressing coordinates of the plurality of cell terminal posts and the positioning deviation values of the plurality of cell terminal posts.

16 Claims, 5 Drawing Sheets

(51) Int. Cl.
  *G06V 10/44* (2022.01)
  *H04N 23/695* (2023.01)
(58) Field of Classification Search
  USPC .................. 348/90, 86, 61, 73, 76, 94, 95
  See application file for complete search history.

(56) References Cited

U.S. PATENT DOCUMENTS

| | | | |
|---|---|---|---|
| 2019/0220999 A1* | 7/2019 | Miyagaki | G06T 7/73 |
| 2023/0196620 A1 | 6/2023 | Zhang et al. | |
| 2024/0193750 A1* | 6/2024 | Ma | H04N 5/04 |
| 2025/0200740 A1* | 6/2025 | Tu | G06V 20/64 |

FOREIGN PATENT DOCUMENTS

| | | |
|---|---|---|
| CN | 206010202 U | 3/2017 |
| CN | 110653525 A | 1/2020 |
| CN | 113790673 A | 12/2021 |
| CN | 114092555 A | 2/2022 |
| CN | 114571073 A | 6/2022 |
| CN | 115027933 A | 9/2022 |
| CN | 115172844 A | 10/2022 |
| CN | 218023783 U | 12/2022 |
| CN | 218193148 U | 1/2023 |
| CN | 117020517 A | 11/2023 |

OTHER PUBLICATIONS

First Office Action received in the counterpart Chinese application 202311289990.0, mailed on Nov. 15, 2023.
Grant Notice received in the counterpart Chinese application 202311289990.0, mailed on Dec. 3, 2023.

* cited by examiner

PRE-WELDING ADDRESSING METHOD AND SYSTEM

CROSS-REFERENCE TO RELATED APPLICATIONS

The present disclosure is a continuation of International Application No. PCT/CN2023/139490, filed on Dec. 18, 2023 which claims priority to Chinese Patent Application No. 202311289990.0 filed on Oct. 8, 2023 and entitled "PRE-WELDING ADDRESSING METHOD AND SYSTEM", which is incorporated herein by reference in its entirety.

TECHNICAL FIELD

Embodiments of the present disclosure relate to the field of battery technologies and to, but are not limited to, a pre-welding addressing method and system.

BACKGROUND ART

In production of a battery, a plurality of terminal posts of a plurality of cells in the battery are welded to a busbar assembly so as to achieve electrical connection of the plurality of cells. However, a misalignment of the busbar assembly with the terminal posts may affect the performance of the battery.

In order to ensure the accuracy of welding, it is required to determine positions of a plurality of terminal posts in a battery pack prior to welding. In the related art, a pre-welding addressing device generally acquires positions of the plurality of terminal posts through movements of a camera on the device. However, since it is impossible to determine a distance for each movement of the camera, the terminal posts cannot always be captured in images acquired by the camera after the movements. In a case where a terminal post is not captured, the position of the camera needs to be adjusted, resulting in a low addressing efficiency and a poor positioning accuracy for the terminal posts, which will directly affect the welding effect of the battery.

SUMMARY OF THE INVENTION

In order to solve the problems in the related art, embodiments of the present disclosure provide a pre-welding addressing method and system, which can automatically retrieve initial addressing coordinates of a plurality of terminal posts in various battery packs based on product information of the battery packs, and thus implement accurate addressing of the terminal posts based on initial addressing coordinates, thereby solving the problem of low addressing efficiency caused by the inability to determine a distance for each movement of a camera.

According to a first aspect, the present disclosure provides a pre-welding addressing method, applied to a controller of a pre-welding addressing system, where the pre-welding addressing system further includes: a frame body, a three-axis addressing mechanism arranged on the frame body, and an addressing camera module arranged on the three-axis addressing mechanism, and the pre-welding addressing method includes: obtaining product information of a to-be-addressed battery pack, in response to the battery pack getting in position, where the battery pack includes a plurality of cells, and the product information includes initial addressing coordinates of a plurality of cell terminal posts; obtaining positioning deviation values of the plurality of cell terminal posts based respectively on the initial addressing coordinates of the plurality of cell terminal posts, where the positioning deviation values of the cell terminal posts are determined based on addressing images of the cell terminal posts that are acquired by the addressing camera module; and determining target addressing coordinates of the plurality of cell terminal posts based respectively on the initial addressing coordinates of the plurality of cell terminal posts and the positioning deviation values of the plurality of cell terminal posts.

In the above embodiment, the initial addressing coordinates of the cell terminal posts in the battery pack are obtained by obtaining the product information of the battery pack, and relative positional relationships between different cell terminal posts can be determined based on the initial addressing coordinates of the cell terminal posts. In this way, when the addressing camera module acquires the addressing images of the cell terminal posts, the distance for each movement of the addressing camera module can be determined based on the relative positional relationships between different cell terminal posts, such that it is ensured that a picture acquired after each movement of the addressing camera module includes a cell terminal post, solving the problem of capturing no cell terminal post and thus moving the addressing camera module repeatedly to acquire addressing images, thereby improving the addressing efficiency for the terminal posts. In addition, in the addressing method provided in this embodiment of the present disclosure, addressing is performed based on the product information of the battery pack, such that the method provided in the embodiments of the present disclosure is applicable to various battery pack products. In addressing for different battery packs, hardware or software of the addressing system does not need to be replaced or debugged. A product formula of a battery pack is automatically retrieved from product information of the battery pack, and then positions of cell terminal posts in the battery pack are accurately addressed by the three-axis addressing mechanism and the addressing camera module of the system, thereby achieving a high compatibility and rapid automatic switching of a plurality of battery pack blueprints. As the addressing for the battery pack does not require a variety of devices, the device development costs are reduced.

In some embodiments, the pre-welding addressing system further includes a three-axis positioning mechanism arranged on the frame body, the three-axis positioning mechanism includes at least a fixing component and a positioning camera module, and the method further includes: controlling the three-axis positioning mechanism to move to a first preset position based on the product information, such that the positioning camera module acquires an image of a positioning component of the battery pack after the three-axis positioning mechanism reaches the first preset position; obtaining a positioning deviation value, between the positioning component and a preset reference point, determined based on the acquired positioning image; and controlling the three-axis positioning mechanism to drive the fixing component to the positioning component based on the positioning deviation value between the positioning component and the preset reference point so as to fix the battery pack to the frame body by the fixing component.

In the above embodiments, after the battery pack is jacked up to a pre-welding addressing station, the battery pack is positioned such that the battery pack is located at an addressing position for addressing, so as to solve the problem that the battery pack is not in a proper addressing position which results in capturing no cell terminal post at the initial addressing position during addressing, thereby improving the addressing efficiency for the cell terminal posts.

In some embodiments, the obtaining positioning deviation values of the plurality of cell terminal posts based respectively on the initial addressing coordinates of the plurality of cell terminal posts includes: controlling the three-axis addressing mechanism to drive the addressing camera module to acquire a plurality of addressing images corresponding to the plurality of cell terminal posts respectively at the initial addressing coordinates of the plurality of cell terminal posts, and obtaining the positioning deviation values of the plurality of cell terminal posts that are determined by the addressing camera module based respectively on the plurality of acquired addressing images; or obtaining a plurality of addressing images corresponding to the plurality of cell terminal posts acquired by the addressing camera module, based respectively on the initial addressing coordinates of the plurality of cell terminal posts; and determining the positioning deviation values of the plurality of cell terminal posts based on the plurality of addressing images.

In the above embodiments, determining positioning deviation values of the cell terminal posts through identifying the addressing images can be performed by the addressing camera module, and the controller obtains the positioning deviation values determined by the addressing camera module. Alternatively, the controller may obtain the plurality of addressing images after the addressing camera module acquires the plurality of addressing images, and the images are identified by the controller to determine the positioning deviation values. In this way, in the embodiments of the present disclosure, either the controller or the addressing camera module may be selected to determine the positioning deviation values of the cell terminal posts as desired, thereby improving the computational efficiency as well as the addressing efficiency for the terminal posts.

In some embodiments, the controlling the three-axis addressing mechanism to drive the addressing camera module to acquire a plurality of addressing images corresponding to the plurality of cell terminal posts respectively at the initial addressing coordinates of the plurality of cell terminal posts includes: controlling the three-axis addressing mechanism to drive the addressing camera module to move, starting from initial addressing coordinates of a last cell terminal post of the battery pack and in a preset sequence, to initial addressing coordinates of a next cell terminal post so as to acquire an image of the next cell terminal post, such that the plurality of addressing images are finally obtained.

In the above embodiments, in acquiring the addressing images, two addressing images are acquired at a time by two addressing acquisition cameras with a variable distance, thereby improving the image acquisition efficiency as well as the addressing speed. In addition, the pre-welding addressing method provided in this embodiment of the present disclosure may be applied, without limitation, to any type of battery pack due to the variable distance of the two addressing acquisition cameras, achieving a high compatibility with battery pack products.

In some embodiments, the addressing camera module includes at least two addressing acquisition cameras; and the controlling the three-axis addressing mechanism to drive the addressing camera module to acquire a plurality of addressing images corresponding to the plurality of cell terminal posts respectively at the initial addressing coordinates of the plurality of cell terminal posts includes: controlling a distance between visual centers of the two addressing acquisition cameras to be a standard distance between two cell terminal posts in the cell; and controlling the three-axis addressing mechanism to drive the two addressing acquisition cameras to move, starting from initial addressing coordinates of two cell terminal posts in a last cell of the battery pack, to initial addressing coordinates of two cell terminal posts in a next cell so as to acquire images of the two cell terminal posts of the next cell, such that the plurality of addressing images are finally obtained.

In some embodiments, the determining the positioning deviation values of the plurality of cell terminal posts based on the plurality of addressing images includes: determining first deviation values in an X-axis direction and second deviation values in a Y-axis direction between visual centers of the plurality of addressing images and centers of the cell terminal posts in the addressing images based on the addressing images, where the positioning deviation values include the first deviation values and the second deviation values.

In the above embodiments, the positioning deviation values of the cell terminal posts are determined by determining the first deviation values in the X-axis direction and the second deviation values in the Y-axis direction for the cell terminal posts, such that offsets of the cell terminal posts can be determined accurately, implementing accurate terminal post addressing.

In some embodiments, the determining target addressing coordinates of the plurality of cell terminal posts based respectively on the initial addressing coordinates of the plurality of cell terminal posts and the positioning deviation values of the plurality of cell terminal posts includes: determining first coordinates of the plurality of cell terminal posts based respectively on the first deviation values of the plurality of cell terminal posts and first initial coordinates in the initial addressing coordinates; determining second coordinates of the plurality of cell terminal posts based respectively on the second deviation values of the plurality of cell terminal posts and second initial coordinates in the initial addressing coordinates; and determining the target addressing coordinates of the plurality of cell terminal posts based respectively on the first coordinates and the second coordinates of the plurality of cell terminal posts.

In the above embodiments, the target addressing coordinates of the cell terminal posts are obtained by calculation on the initial addressing coordinates and the positioning deviation values of the cell terminal posts, thereby improving the addressing accuracy for the cell terminal posts.

In some embodiments, the pre-welding addressing system further includes a jacking mechanism arranged on the frame body and the three-axis positioning mechanism arranged on the frame body, and the three-axis positioning mechanism includes at least the fixing component; and after the target addressing coordinates of the cell terminal posts are determined, the pre-welding addressing method further includes: controlling the fixing component in the three-axis positioning mechanism to be disengaged from the positioning component of the battery pack; and controlling the jacking mechanism on the frame body to perform a first jacking action, in response to the fixing component being disengaged from the positioning component, so as to lower the to-be-addressed battery pack to a preset height and place the to-be-addressed battery pack onto a transport trolley.

In the above embodiments, when the pre-welding addressing for the battery pack is completed, the battery pack is automatically brought away from the pre-welding addressing station, implementing automated addressing for the battery pack, thereby improving the pre-welding addressing efficiency.

According to a second aspect, an embodiment of the present disclosure provides a pre-welding addressing system, including at least: a frame body, a controller, a three-axis addressing mechanism, and an addressing camera module, where the three-axis addressing mechanism is mounted on the frame body and is capable of generating a movement relative to the frame body;

the addressing camera module is mounted on the three-axis addressing mechanism; the addressing camera module is movable relative to the frame body as driven by the three-axis addressing mechanism; and the controller is electrically connected to the three-axis addressing mechanism and is configured to: obtain product information of a to-be-addressed battery pack, in response to the to-be-addressed battery pack getting in position, where the battery pack includes a plurality of cells, and the product information includes initial addressing coordinates of a plurality of cell terminal posts; obtain positioning deviation values of the plurality of cell terminal posts based respectively on the initial addressing coordinates of the plurality of cell terminal posts, where the positioning deviation values of the cell terminal posts are determined based on addressing images of the cell terminal posts that are acquired by the addressing camera module; and determine target addressing coordinates of the plurality of cell terminal posts based respectively on the initial addressing coordinates of the plurality of cell terminal posts and the positioning deviation values of the plurality of cell terminal posts.

In the above embodiment, the frame body is arranged in the pre-welding addressing system, such that the components in the pre-welding addressing system can be carried and mounted on the frame body, and the pre-welding addressing system can be fixedly mounted at the corresponding addressing station. Also, the addressing camera module is provided, which can obtain visual images of the cell terminal posts in the battery pack, the target addressing coordinates of the cell terminal posts can be determined based on the obtained visual images and preset initial addressing coordinates of the cell terminal posts. In addition, the three-axis addressing mechanism is arranged on the frame body, and the addressing camera module is arranged on the three-axis addressing mechanism, such that the addressing camera module can be driven to move to different positions by the three-axis addressing mechanism, such that the visual images of the cell terminal posts in the battery pack can be obtained, thereby further determining the target addressing coordinates of the cell terminal posts efficiently and quickly.

In some embodiments, the three-axis addressing mechanism includes: a transverse addressing driving assembly arranged on the frame body and capable of generating a movement in a first direction relative to the frame body; a longitudinal addressing driving assembly connected to the transverse addressing driving assembly and capable of generating a movement in a second direction relative to the frame body; and a vertical addressing driving assembly connected to the longitudinal addressing driving assembly and capable of generating a movement in a third direction relative to the frame body, the addressing camera module being fixed to the vertical addressing driving assembly, where there is an included angle between the first direction and the second direction, and both the first direction and the second direction are perpendicular to the third direction.

In the above embodiments, the transverse addressing driving assembly is arranged in the three-axis addressing mechanism, such that the addressing camera module can be driven to move in the first direction by the transverse addressing driving assembly. The longitudinal addressing driving assembly is arranged on the transverse addressing driving assembly, such that the addressing camera module can be driven to move in the second direction by the longitudinal addressing driving assembly. In addition, the vertical addressing driving assembly is arranged on the longitudinal addressing driving assembly, and the addressing camera module is fixed to the vertical addressing driving assembly, such that the addressing camera module can be driven to move in the third direction by the vertical addressing driving assembly. As such, the addressing camera module can move to a desired position in space so as to obtain visual images of all the cell terminal posts in the battery pack.

In some embodiments, the pre-welding addressing system further includes a three-axis positioning mechanism arranged on the frame body, and the three-axis positioning mechanism includes at least a positioning driving assembly, a fixing component, and a positioning camera module, where the positioning driving assembly is arranged on the frame body, and the positioning driving assembly is electrically connected to the controller; the fixing component is arranged on the positioning driving assembly; the positioning camera module is arranged on the positioning driving assembly at a position aligned with the fixing component; the positioning driving assembly is configured to drive the fixing component and the positioning camera module to move; the controller is further configured to control the three-axis positioning mechanism to move to a first preset position based on the product information; the positioning camera module is configured to acquire an image of a positioning component of the battery pack at the first preset position; and the controller is further configured to: obtain a positioning deviation value, between the positioning component and a preset reference point, determined based on the acquired positioning image; and control the three-axis positioning mechanism to drive the fixing component to the positioning component based on the positioning deviation value between the positioning component and the preset reference point so as to fix the battery pack to the frame body by the fixing component.

In the above embodiments, the positioning camera module is arranged in the three-axis positioning mechanism, such that a visual image of the positioning component on the battery pack can be obtained by the positioning camera module, thereby determining an accurate position of the positioning component. Also, the fixing component that matches the positioning component is provided. The fixing component can be connected to the positioning component to position the battery pack, such that the battery pack is located at a fixed position relative to the frame body. In addition, the positioning driving assembly is provided, and can drive the fixing component and the positioning camera module to move to a position corresponding to the positioning component on the battery pack. As such, positions of positioning components on different battery packs can be determined quickly and accurately, such that the battery packs can be positioned by the fixing components.

In some embodiments, the positioning driving assembly includes: a transverse positioning driving assembly arranged on the frame body and capable of generating a movement in the first direction relative to the frame body; a longitudinal positioning driving assembly connected to the transverse positioning driving assembly and capable of generating a movement in the second direction relative to the frame body;

and a vertical positioning driving assembly connected to the longitudinal positioning driving assembly and capable of generating a movement in the third direction relative to the frame body, both the positioning camera module and the fixing component being fixed to the vertical positioning driving assembly, where there is an included angle between the first direction and the second direction, and both the first direction and the second direction are perpendicular to the third direction.

In the above embodiments, the transverse positioning driving assembly is arranged in the three-axis positioning mechanism, such that the positioning camera module and the fixing component can be driven to move in the first direction by the transverse positioning driving assembly. The longitudinal positioning driving assembly is arranged on the transverse positioning driving assembly, such that the positioning camera module and the fixing component can be driven to move in the second direction by the longitudinal positioning driving assembly. In addition, the vertical positioning driving assembly is arranged on the longitudinal positioning driving assembly, and both the positioning camera module and the fixing component are fixedly connected to the vertical positioning driving assembly, such that the positioning camera module and the fixing component can be driven to move in the third direction by the vertical positioning driving assembly. As such, the positioning camera module and the fixing component can move to a desired position in space so as to obtain a visual image of the positioning component on the battery pack and control the fixing component to be connected to the positioning component, such that the battery pack can be positioned quickly and accurately.

In some embodiments, the addressing camera module is further configured to acquire a plurality of addressing images corresponding to the plurality of cell terminal posts respectively at the initial addressing coordinates of the plurality of cell terminal posts, and determine the positioning deviation values of the plurality of cell terminal posts based on the plurality of acquired addressing images; or the controller is further configured to: obtain a plurality of addressing images corresponding to the plurality of cell terminal posts acquired by the addressing camera module, based respectively on the initial addressing coordinates of the plurality of cell terminal posts; and determine the positioning deviation values of the plurality of cell terminal posts based on the plurality of addressing images.

In the above embodiments, determining the positioning deviation values of the cell terminal posts through identifying the addressing images can be performed by the addressing camera module, and the controller obtains the positioning deviation values determined by the addressing camera module. Alternatively, the controller may obtain the plurality of addressing images after the addressing camera module acquires the plurality of addressing images, and the images are identified by the controller to determine the positioning deviation values. In this way, in the embodiments of the present disclosure, either the controller or the addressing camera module may be selected to determine the positioning deviation values of the cell terminal posts as desired, thereby improving the computational efficiency as well as the addressing efficiency for the terminal posts.

In some embodiments, the addressing camera module includes at least two addressing acquisition cameras; the controller is further configured to control a distance between visual centers of the two addressing acquisition cameras to be a standard distance between two cell terminal posts in the cell; the controller is further configured to control the three-axis addressing mechanism to drive the two addressing acquisition cameras to move, starting from initial addressing coordinates of two cell terminal posts in a last cell of the battery pack, to initial addressing coordinates of two cell terminal posts in a next cell; and the two addressing acquisition cameras are configured to acquire images of the two cell terminal posts of the next cell, such that the plurality of addressing images are finally obtained.

In the above embodiments, when the addressing camera module acquires the addressing images, two addressing images are acquired at a time by two addressing acquisition cameras with a variable distance, thereby improving the image acquisition efficiency as well as the addressing speed. In addition, the pre-welding addressing method provided in this embodiment of the present disclosure may be applied, without limitation, to any type of battery pack due to the variable distance of the two addressing acquisition cameras, achieving a high compatibility with battery pack products.

In some embodiments, the pre-welding addressing system further includes a jacking mechanism arranged on the frame body; the controller is further configured to control the fixing component in the three-axis positioning mechanism to be disengaged from the positioning component of the battery pack; and the jacking mechanism is configured to lower the to-be-addressed battery pack to a preset height and place the to-be-addressed battery pack onto a transport trolley, in response to the fixing component being disengaged from the positioning component.

In the above embodiments, when the pre-welding addressing for the battery pack is completed, the battery pack is automatically brought away from the pre-welding addressing station, implementing automated addressing for the battery pack, thereby improving the pre-welding addressing efficiency.

In some embodiments, the jacking mechanism includes: a jacking driving member with one end being connected to the frame body; a jacking transmission member slidably connected to the frame body, with the other end of the jacking driving member being connected to the jacking transmission member; and a jacking beam slidably connected to the frame body and in transmission connection with the jacking transmission member, where the jacking transmission member is capable of driving the jacking beam to move in the third direction when the jacking driving member drives the jacking transmission member to move.

In the above embodiments, the jacking beam slidably connected to the frame body is arranged in the jacking mechanism, such that the battery pack can be carried and supported by the jacking beam. The jacking transmission member is slidably arranged on the frame body, and the jacking driving member connected to the jacking transmission member is arranged on the frame body, such that the jacking transmission member can be driven to move by the jacking driving member so as to drive the jacking beam to move in the third direction. As such, when the battery pack is located at the position corresponding to the jacking mechanism, the battery pack can be jacked up to move in the third direction by the jacking mechanism, such that the battery pack can be separated from the transport trolley or placed onto the transport trolley.

The above description is merely an overview of the technical solutions of the present disclosure, which can be carried out according to the contents of the description in order to make technical means of the present disclosure more clearly understood, and in order to make the above and other objects, features, and advantages of the present disclosure more easily understood, specific implementations of the present disclosure are exemplarily described below.

DESCRIPTION OF REFERENCE SIGNS

Figure 1:
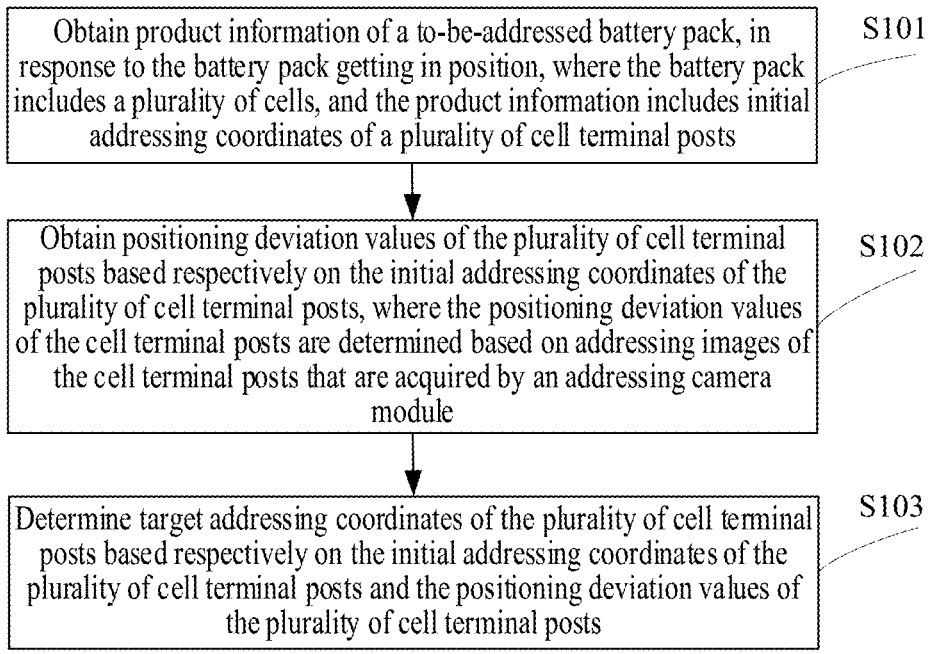
FIG. 1 is a first alternative schematic flowchart of a pre-welding addressing method according to an embodiment of the present disclosure.

1—frame body; 2—three-axis addressing mechanism; 21—transverse addressing driving assembly; 211—transverse addressing driving member; 212—transverse addressing sliding assembly; 22—longitudinal addressing driving assembly; 221—longitudinal addressing driving member; 222—longitudinal addressing sliding assembly; 23—vertical addressing driving assembly; 231—vertical addressing driving member; 232—vertical addressing sliding assembly; 3—addressing camera module; 4—three-axis positioning mechanism; 41—positioning camera module; 42—fixing component; 43—positioning driving assembly; 431—transverse positioning driving assembly; 4311—transverse positioning driving member; 4312—transverse positioning sliding assembly; 432—longitudinal positioning driving assembly; 4321—longitudinal positioning driving member; 4322—longitudinal positioning sliding assembly; 433—vertical positioning driving assembly; 4331—vertical positioning driving member; 4332—vertical positioning sliding assembly; 5—jacking mechanism; 51—jacking support; 52—jacking driving member; 53—jacking transmission member; 54—jacking beam; A—first direction; B—second direction; C—third direction; 701—jacking structure; 702—three-axis pull-pin mechanism; 703—three-axis pull-pin camera; 704—case hole; 705—pull pin; 706—addressing camera; 707—servo motor.

DETAILED DESCRIPTION OF EMBODIMENTS

In order to make objects, technical solutions, and advantages of the present disclosure clearer, the following describes the present disclosure in further detail with reference to the accompanying drawings. The described embodiments are not to be considered as a limitation to the present disclosure. All other embodiments obtained by those of ordinary skill in the art without creative efforts shall fall within the protection scope of the present disclosure.

In the following description, the term "some embodiments" describes subsets of all possible embodiments, but it is to be understood that "some embodiments" may be the same subset or different subsets of all the possible embodiments, and can be combined with each other without conflict. Unless otherwise defined, all technical and scientific terms used in the embodiments of the present disclosure have the same meanings as those commonly understood by those skilled in the art to which the embodiments of the present disclosure belong. The terms used in the embodiments of the present disclosure are merely for the purpose of describing the embodiments of the present disclosure, but are not intended to limit the present disclosure.

In design of a battery pack, the position of each cell terminal post in the battery pack is set. However, in actual production, a distance between adjacent cell terminal posts is not a preset standard distance due to production errors. Therefore, the cell terminal posts of the battery pack need to be addressed prior to welding of the terminal posts.

In the related art, prior to the welding of the terminal posts with a busbar assembly, positions of the terminal posts are acquired through movements of a camera on a pre-welding addressing device so as to implement the addressing of the cell terminal posts. However, in the related art, since it is impossible to determine a distance for each movement of the camera, the terminal posts cannot always be captured in images acquired by the camera after the movements. In a case where a terminal post is not captured, the position of the camera needs to be adjusted, resulting in a low addressing efficiency and a poor positioning accuracy for the terminal posts, which will directly affect the welding effect of the battery.

In order to alleviate the problem of low addressing efficiency for the terminal posts in the related art, the applicant has found that product information of a to-be-addressed battery pack, which includes initial addressing coordinates of a plurality of cell terminal posts, can be obtained before the camera performs photographing. The initial addressing coordinates are coordinates of the plurality of cell terminal posts in the battery pack, without production errors, during production of the battery pack, i.e., standard coordinates of the cell terminal posts in the battery pack. The distance for each movement of the camera can be determined based on the initial addressing coordinates such that it is ensured that a picture acquired after each movement of the camera includes a terminal post, thereby improving the addressing efficiency for the terminal posts.

Based on the above considerations, in order to solve the problem of low addressing efficiency caused by the inability to determine the distance for each movement of the camera, the inventor has found the following through intensive studies. Product information of a to-be-addressed battery pack, which includes initial addressing coordinates of a plurality of cell terminal posts is obtained in response to the battery pack getting in position on a pre-welding addressing system; addressing images of the plurality of cell terminal posts are acquired based on the initial addressing coordinates of the plurality of cell terminal posts so as to obtain positioning deviation values from the initial addressing coordinates for the plurality of cell terminal posts respectively; and then target addressing coordinates of the plurality of cell terminal posts are determined based respectively on the initial addressing coordinates and the positioning deviation values of the plurality of cell terminal posts.

As such, the initial addressing coordinates of the cell terminal posts in the battery pack are obtained by obtaining the product information of the battery pack, and relative positional relationships between different cell terminal posts can be determined based on the initial addressing coordinates of the cell terminal posts. In this way, when an addressing camera module acquires the addressing images of the cell terminal posts, the distance for each movement of the addressing camera module can be determined based on the relative positional relationships between different cell terminal posts, such that it is ensured that a picture acquired after each movement of the addressing camera module includes a cell terminal post, solving the problem of capturing no cell terminal post and thus moving the addressing camera module repeatedly to acquire addressing images, thereby improving the addressing efficiency for the terminal posts. In addition, in the pre-welding addressing method provided in the embodiments of the present disclosure, addressing is performed based on the product information of the battery pack, such that the method provided in the embodiments of the present disclosure is applicable to various battery pack products. In addressing for different battery packs, hardware or software of the addressing system does not need to be replaced or debugged. A product formula of a battery pack is automatically retrieved from product information of the battery pack, and then positions of cell terminal posts in the battery pack are accurately addressed by a three-axis addressing mechanism and the addressing camera module of the system, thereby achieving a high compatibility and rapid automatic switching of a plurality of battery pack blueprints. As the addressing for the battery pack does not require a variety of devices, the device development costs are reduced.

The pre-welding addressing method provided in the embodiments of the present disclosure is applied prior to welding of the terminal posts with the busbar assembly, and the welded battery pack may be used in various power consuming apparatuses, including but not limited to vehicles, ships, or aircraft. A power source system of the power consuming apparatus may be composed of the battery pack disclosed in the present disclosure.

The pre-welding addressing method provided in the embodiments of the present disclosure is applied to a controller of a pre-welding addressing system, and the pre-welding addressing system further includes a frame body, a three-axis addressing mechanism arranged on the frame body, and an addressing camera module arranged on the three-axis addressing mechanism. The controller, as used herein, may be any one of a programmable logic controller (PLC), a single chip microcomputer, an intermediary computer, and an upper computer. The controller may include a processor, and a memory storing instructions executable by the processor that, when executed by the processor, implement the pre-welding addressing method provided in the embodiments of the present disclosure. The three-axis addressing mechanism is a gantry three-axis mechanism on the frame body, which drives the addressing camera module to move, and the addressing camera module is an image acquisition apparatus of the pre-welding addressing system. The three-axis addressing mechanism is configured to drive the addressing camera module to implement addressing of the cell terminal posts. The pre-welding addressing method provided in the embodiments of the present disclosure is performed by the controller.

In some embodiments, the battery pack includes a plurality of cells which may be in series connection or in parallel connection or in series-parallel connection, where the series-parallel connection means that some of the plurality of cells are in series connection and some are in parallel connection. The series connection or parallel connection or series-parallel connection among the plurality of cells is implemented by welding of the cell terminal posts of the cells with the busbar assembly. Each cell may be a secondary battery or a primary battery; or may be a lithium-sulfur battery, a sodium-ion battery, or a magnesium-ion battery, but is not limited thereto. The cell may be in a cylindrical shape, a flat shape, a cuboid shape, or another shape.

FIG. 1 is a first alternative schematic flowchart of a pre-welding addressing method according to an embodiment of the present disclosure. As shown in FIG. 1, the pre-welding addressing method provided in this embodiment of the present disclosure can be implemented by step S101 to step S103.

In step S101, product information of a to-be-addressed battery pack is obtained, in response to the battery pack getting in position, where the battery pack includes a plurality of cells, and the product information includes initial addressing coordinates of a plurality of cell terminal posts.

In the embodiments of the present disclosure, the to-be-addressed battery pack is a battery pack for which the cell terminal posts will be addressed through the pre-welding addressing system, and the to-be-addressed battery pack getting in position may refer to the to-be-addressed battery pack being transported to a station of the pre-welding addressing system by an automated guided vehicle (AGV), and the battery pack being fixed to the station by a three-axis positioning mechanism of the pre-welding addressing system. The controller obtains the product information of the to-be-addressed battery pack by obtaining a fixed serial number of the battery pack.

In some embodiments, the product information of the battery pack may be obtained by scanning a QR code or a bar code on the battery pack. Each battery pack has a corresponding fixed serial number for indicating a battery type and the product information. The product information may refer to blueprint data and a production formula of the battery pack.

The battery pack includes a plurality of cells, each cell including two cell terminal posts. The blueprint data in the product information refers to position information of a positioning component (i.e., a mark point of the battery pack) and the cell terminal posts in the battery pack, i.e., coordinates of the positioning component and the cell terminal posts when the battery pack is located at an addressing position on a pre-welding addressing station. The production formula refers to information including the position where the addressing camera module acquires an image, the position of the battery pack where addressing is performed through the addressing camera module, the position of the addressing camera module where the cell terminal posts in the battery pack are photographed, initial addressing coordinates of the cell terminal posts on the frame body of the pre-welding addressing system, etc., when the cell terminal posts are addressed for the battery pack through the pre-welding addressing system.

In some embodiments, the initial addressing coordinates are coordinates of the battery pack at the corresponding station of the pre-welding addressing system in the blueprint data, i.e., coordinates with the pre-welding addressing station as a reference coordinate system. The initial addressing coordinates include coordinates of the positioning component and the plurality of cell terminal posts in the battery pack at the pre-welding addressing station. The initial addressing coordinates include at least X-axis coordinates and Y-axis coordinates of the cell terminal posts at the pre-welding addressing station.

In step S102, positioning deviation values of the plurality of cell terminal posts are obtained based respectively on the initial addressing coordinates of the plurality of cell terminal posts, where the positioning deviation values of the cell terminal posts are determined based on addressing images of the cell terminal posts that are acquired by the addressing camera module.

In some embodiments, the addressing camera module may refer to an addressing camera located on the three-axis addressing mechanism in the pre-welding addressing system. After the initial addressing coordinates of the plurality of cell terminal posts are obtained, a visual center of the addressing camera module is controlled to coincide with each of the initial addressing coordinates of the cell terminal posts, and the addressing images are acquired at the positions of the initial addressing coordinates corresponding to the cell terminal posts, such that the addressing images all include cell terminal posts corresponding to the coordinates. Then the positioning deviation values of the cell terminal posts are determined based on centers of the cell terminal posts in the addressing images and image centers (i.e., the visual center of the addressing camera module).

The positioning deviation values may include deviation values in an X-axis direction and deviation values in a Y-axis direction, and the deviation values may be obtained through identifying the acquired addressing images by the addressing camera module, or may be obtained by the addressing camera module based on pixels between the centers of the cell terminal posts in the addressing images and the centers of the addressing images.

In step S103, target addressing coordinates of the plurality of cell terminal posts are determined based respectively on the initial addressing coordinates of the plurality of cell terminal posts and the positioning deviation values of the plurality of cell terminal posts.

In the embodiments of the present disclosure, after the positioning deviation values of the plurality of cell terminal posts are obtained, the target addressing coordinates of the cell terminal posts can be obtained by calculation on the positioning deviation values and the initial addressing coordinates of the corresponding cell terminal posts. For example, after the initial addressing coordinates of the cell terminal posts are obtained, calculations are performed respectively in the X-axis direction and the Y-axis direction based on the X-axis coordinates and the Y-axis coordinates of the initial addressing coordinates as well as the deviation values in the X-axis direction and the deviation values in the Y-axis direction corresponding to the cell terminal posts, so as to obtain the target addressing coordinates of the plurality of cell terminal posts.

In this embodiment of the present disclosure, the initial addressing coordinates of the cell terminal posts in the battery pack are obtained by obtaining the product information of the battery pack, and relative positional relationships between different cell terminal posts can be determined based on the initial addressing coordinates of the cell terminal posts. In this way, when the addressing camera module acquires the addressing images of the cell terminal posts, the distance for each movement of the addressing camera module can be determined based on the relative positional relationships between different cell terminal posts, such that it is ensured that a picture acquired after each movement of the addressing camera module includes a cell terminal post, solving the problem of capturing no cell terminal post and thus moving the addressing camera module repeatedly to acquire addressing images, thereby improving the addressing efficiency for the terminal posts. In addition, in the pre-welding addressing method provided in this embodiment of the present disclosure, addressing is performed based on the product information of the battery pack, such that the method provided in this embodiment of the present disclosure is applicable to various battery pack products. In addressing for different battery packs, hardware or software of the addressing system does not need to be replaced or debugged. A product formula of a battery pack is automatically retrieved from product information of the battery pack, and then positions of cell terminal posts in the battery pack are accurately addressed by the three-axis addressing mechanism and the addressing camera module of the system, thereby achieving a high compatibility and rapid automatic switching of a plurality of battery pack blueprints. As the addressing for the battery pack does not require a variety of devices, the device development costs are reduced.

In some embodiments, the system further includes a three-axis positioning mechanism arranged on the frame body, and the three-axis positioning mechanism includes at least a fixing component and a positioning camera module. The fixing component on the three-axis positioning mechanism may be a pull pin arranged on the three-axis positioning mechanism, and the positioning camera module may be an image acquisition apparatus, such as a camera, on the three-axis positioning mechanism. The three-axis positioning mechanism functions to fix the battery pack at the pre-welding addressing station.

In some embodiments, when the AGV trolley jacks up the to-be-addressed battery pack to the pre-welding addressing station, the battery pack is placed at the addressing position of the battery pack specified in the production formula of the battery pack. In order to fix the position of the battery pack at the station, the position of the positioning component (i.e., a mark hole) on the battery pack can be determined by the image acquisition apparatus on the three-axis positioning mechanism, and the pull pin of the three-axis positioning mechanism is inserted into the positioning component of the battery pack to implement the positioning of the battery pack at the pre-welding addressing station. The addressing position may be the position of the battery pack specified in the production formula where addressing is performed at the pre-welding addressing station.

In some embodiments, when the AGV trolley jacks up the to-be-addressed battery pack to the pre-welding addressing station, the battery pack is not placed in the addressing position accurately. Therefore, the battery pack needs to be brought by the three-axis positioning mechanism to the addressing position of the battery pack specified in the production formula. The pull pin on the three-axis positioning mechanism can drive the battery pack to move after the pull pin becomes inserted into the positioning component of the battery pack, such that the battery pack is placed onto the addressing position at the pre-welding addressing station.

Figure 2:
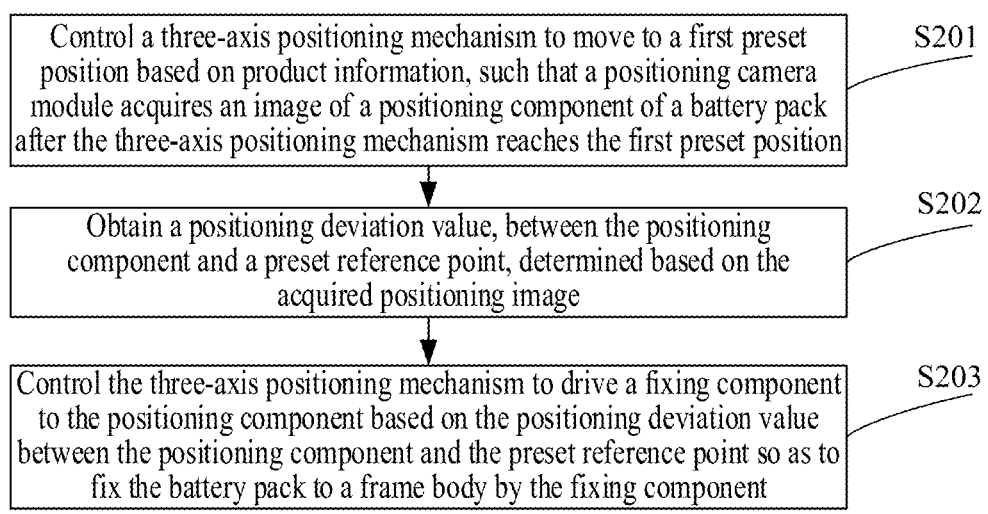
FIG. 2 is a second alternative schematic flowchart of a pre-welding addressing method according to an embodiment of the present disclosure.

In some embodiments, FIG. 2 is a second alternative schematic flowchart of a pre-welding addressing method according to an embodiment of the present disclosure. As shown in FIG. 2, the battery pack needs to be positioned prior to addressing for the battery pack. The pre-welding addressing method provided in this embodiment of the present disclosure may further include step S201 to step S203.

In step S201, the three-axis positioning mechanism is controlled to move to a first preset position based on the product information, such that the positioning camera module acquires an image of the positioning component of the battery pack after the three-axis positioning mechanism reaches the first preset position.

In some embodiments, the product information includes the production formula of the battery pack. The production formula includes at least the position of the battery pack at the pre-welding addressing station where addressing is performed for the battery pack through the addressing camera module, i.e., the first preset position.

In some embodiments, prior to addressing, the AGV trolley jacks up the battery pack to the addressing position at the station based on the production formula of the battery pack. The controller controls the three-axis positioning mechanism to move, and when the three-axis positioning mechanism reaches the first preset position, the positioning camera module acquires the image of the positioning component of the battery pack, and the acquired image includes at least the positioning component of the battery pack.

In step S202, a positioning deviation value, between the positioning component and a preset reference point, determined based on the acquired positioning image is obtained.

The preset reference point may refer to a visual center of the positioning camera module in image acquisition after the three-axis positioning mechanism reaches the first preset position. The positioning camera module identifies the positioning deviation value between the center of the positioning component and the preset reference point after image acquisition. The positioning deviation value may include a deviation value in the X-axis direction and a deviation value in the Y-axis direction.

In step S203, the three-axis positioning mechanism is controlled to drive the fixing component to the positioning component based on the positioning deviation value between the positioning component and the preset reference point so as to fix the battery pack to the frame body by the fixing component.

The three-axis positioning mechanism is controlled to move based on the deviation value in the X-axis direction and the deviation value in the Y-axis direction. After moving along the X axis by the deviation value in the X-axis direction and along the Y axis by the deviation value in the Y-axis direction, the fixing component reaches a position above the positioning component, and the center of the fixing component coincides, in a Z-axis direction, with the center of the positioning component.

The fixing component is controlled to move downwards in the Z-axis direction until the fixing component becomes inserted into the positioning component so as to fix the battery pack to the frame body of the pre-welding addressing station by the fixing component.

In some embodiments, after the battery pack is fixed by the fixing component, the three-axis positioning mechanism may be controlled to move if the battery pack is not located at the addressing position of the battery pack, such that the battery pack is driven by the fixing component to move to the addressing position of the battery pack.

In the embodiments of the present disclosure, after the battery pack is jacked up to the pre-welding addressing station, the battery pack is positioned such that the battery pack is located at the addressing position for addressing, so as to solve the problem that the battery pack is not in a proper addressing position which results in capturing no cell terminal post at the initial addressing position during addressing, thereby improving the addressing efficiency for the cell terminal posts.

In some embodiments, step S102 can be implemented by step S1 or step S2.

In step S1, the three-axis addressing mechanism is controlled to drive the addressing camera module to acquire a plurality of addressing images corresponding to the plurality of cell terminal posts respectively at the initial addressing coordinates of the plurality of cell terminal posts, and the positioning deviation values of the plurality of cell terminal posts that are determined by the addressing camera module based respectively on the plurality of acquired addressing images are obtained.

In some embodiments, the controller may control the three-axis addressing mechanism to drive the addressing camera module to acquire the plurality of addressing images corresponding to the plurality of cell terminal posts respectively at the initial addressing coordinates of the plurality of cell terminal posts, and after the addressing camera module determines the positioning deviation values of the cell terminal posts based on the addressing images corresponding to the cell terminal posts, the controller obtains the positioning deviation values of the plurality of cell terminal posts determined by the addressing camera module based respectively on the plurality of acquired addressing images.

In some embodiments, the addressing camera module acquiring the plurality of addressing images may refer to controlling the three-axis addressing mechanism to drive the addressing camera module to move, starting from initial addressing coordinates of a last cell terminal post of the battery pack and in a preset sequence, to initial addressing coordinates of a next cell terminal post so as to acquire an image of the next cell terminal post, such that the plurality of addressing images are finally obtained. The preset sequence may be a preset acquisition sequence. For example, the addressing images of all the cell terminal posts in the battery pack can be acquired in an S-type sequence, where the addressing images corresponding to the cell terminal posts are acquired in sequence starting from the first cell terminal post in the battery pack, until the plurality of addressing images are obtained. The preset sequence may be any sequence in which addressing images corresponding to all the cell terminal posts can be acquired.

In step S2, a plurality of addressing images corresponding to the plurality of cell terminal posts acquired by the addressing camera module are obtained based respectively on the initial addressing coordinates of the plurality of cell terminal posts; and the positioning deviation values of the plurality of cell terminal posts are determined based on the plurality of addressing images.

In some embodiments, the controller may further obtain the plurality of addressing images after the addressing camera module acquires the plurality of addressing images corresponding to the plurality of cell terminal posts respectively at the initial addressing coordinates of the plurality of cell terminal posts, and identify the plurality of addressing images to determine the positioning deviation values of the plurality of cell terminal posts based on the plurality of addressing images.

In the embodiments of the present disclosure, determining the positioning deviation values of the cell terminal posts through identifying the addressing images can be performed by the addressing camera module, and the controller obtains the positioning deviation values determined by the addressing camera module. Alternatively, the controller may obtain the plurality of addressing images after the addressing camera module acquires the plurality of addressing images, and the images are identified by the controller to determine the positioning deviation values. In this way, in the embodiments of the present disclosure, either the controller or the addressing camera module may be selected to determine the positioning deviation values of the cell terminal posts as desired, thereby improving the computational efficiency as well as the addressing efficiency for the terminal posts.

In some embodiments, the addressing camera module includes at least two addressing acquisition cameras, and a distance between the two addressing acquisition cameras is variable, and therefore, the distance between the two addressing acquisition cameras can be changed based on the product information of the battery pack such that the visual addressing system can acquire two addressing images at a time, thereby improving the addressing efficiency.

In some embodiments, controlling the three-axis addressing mechanism to drive the addressing camera module to acquire the plurality of addressing images corresponding to the plurality of cell terminal posts respectively at the initial addressing coordinates of the plurality of cell terminal posts in step S1 can be implemented by step S11 and step S12.

In step S11, a distance between visual centers of the two addressing acquisition cameras is controlled to be a standard distance between two cell terminal posts in the cell.

In some embodiments, the standard distance between two cell terminal posts is a distance between two cell terminal posts that is set in design of the battery pack. However, in actual production, the distance between adjacent cell terminal posts is not the standard distance due to production errors. Therefore, the cell terminal posts of the battery pack need to be addressed.

In the embodiments of the present disclosure, after the product information of the battery pack is obtained, the standard distance between two cell terminal posts that is set in design of the battery pack can be obtained from the blueprint data of the product information. The distance between the visual centers of the two addressing acquisition cameras is controlled to be a standard distance between two cell terminal posts in cells, such that the addressing camera module can acquire two addressing images at a time when acquiring the addressing images, thereby improving the addressing efficiency.

In some embodiments, there may be a plurality of addressing acquisition cameras, and the plurality of addressing acquisition cameras may be arranged in a straight line parallel to the X axis or Y axis, or may be uniformly arranged in a square or another shape. After the standard distance between two cell terminal posts is obtained, a distance between two adjacent addressing acquisition cameras in the plurality of addressing acquisition cameras is controlled to be the standard distance in the X-axis direction or the Y-axis direction, such that the addressing camera module can acquire a plurality of addressing images at a time when acquiring the addressing images.

In step S12, the three-axis addressing mechanism is controlled to drive the two addressing acquisition cameras to move, starting from initial addressing coordinates of two cell terminal posts in a last cell of the battery pack, to initial addressing coordinates of two cell terminal posts in a next cell so as to acquire images of the two cell terminal posts of the next cell, such that the plurality of addressing images are finally obtained.

In acquiring the addressing images by the two addressing acquisition cameras, the three-axis addressing mechanism is controlled to drive the two addressing acquisition cameras to move by positions of two cell terminal posts at a time, starting from the first cell terminal post in the battery pack and in a preset sequence, so as to successively acquire addressing images corresponding to every two cell terminal posts, until the plurality of addressing images are obtained.

In the embodiments of the present disclosure, in acquiring the addressing images, two addressing images are acquired at a time by two addressing acquisition cameras with a variable distance, thereby improving the image acquisition efficiency as well as the addressing speed. In addition, the pre-welding addressing method provided in this embodiment of the present disclosure may be applied, without limitation, to any type of battery pack due to the variable distance of the two addressing acquisition cameras, achieving a high compatibility with battery pack products.

In some embodiments, step S102 can be further implemented by step S3.

In step S3, first deviation values in the X-axis direction and second deviation values in the Y-axis direction between the visual centers of the plurality of addressing images and centers of the cell terminal posts in the addressing images are determined based on the addressing images, where the positioning deviation values include the first deviation values and the second deviation values.

In some embodiments, the offset of a cell terminal post is not an offset in one of the X-axis direction or the Y-axis direction, but offsets in both directions. Therefore, in the embodiments of the present disclosure, in determining the positioning deviation values of the cell terminal posts, the first deviation values in the X-axis direction and the second deviation values in the Y-axis direction of the centers of the cell terminal posts are determined based respectively on the visual centers of the addressing images and the centers of the cell terminal posts in the addressing images, such that the positioning deviation values of the cell terminal posts are determined based on the first deviation values and the second deviation values.

In the embodiments of the present disclosure, the positioning deviation values of the cell terminal posts are determined by determining the first deviation values in the X-axis direction and the second deviation values in the Y-axis direction for the cell terminal posts, such that offsets of the cell terminal posts can be determined accurately, implementing accurate terminal post addressing.

In some embodiments, step S103 can be implemented by step S4 to step S6.

In step S4, first coordinates of the plurality of cell terminal posts are determined based respectively on the first deviation values of the plurality of cell terminal posts and first initial coordinates in the initial addressing coordinates.

In some embodiments, the first initial coordinates in the initial addressing coordinates may be X coordinates of the cell terminal posts at the pre-welding addressing station, and calculation is performed based on the first deviation values of the plurality of cell terminal posts and the first initial coordinates in the initial addressing coordinates to obtain the first coordinates of the cell terminal posts after addressing, i.e., the X coordinates.

The calculation between the first deviation values and the first initial coordinates may be addition or subtraction calculation, which depends on the relative positional relationship between the addressing camera module and the preset reference point, such that the first coordinates of the cell terminal posts are obtained.

In step S5, second coordinates of the plurality of cell terminal posts are determined based respectively on the second deviation values of the plurality of cell terminal posts and second initial coordinates in the initial addressing coordinates.

In some embodiments, the second initial coordinates in the initial addressing coordinates may be Y coordinates of the cell terminal posts at the pre-welding addressing station, and calculation is performed based on the second deviation values of the plurality of cell terminal posts and the second initial coordinates in the initial addressing coordinates to obtain the second coordinates of the cell terminal posts after addressing, i.e., the Y coordinates.

The calculation between the second deviation values and the second initial coordinates may be addition or subtraction calculation as well, which depends on the relative positional relationship between the addressing camera module and the preset reference point, such that the second coordinates of the cell terminal posts are obtained.

In step S6, the target addressing coordinates of the plurality of cell terminal posts are determined based respectively on the first coordinates and the second coordinates of the plurality of cell terminal posts.

After the X and Y coordinates of the cell terminal posts are determined, the X and Y coordinates of the plurality of cell terminal posts are respectively determined as the target addressing coordinates of the plurality of cell terminal posts.

After the target addressing coordinates of the cell terminal posts are determined, the relative positional relationship between the cell terminal posts in the battery pack can be obtained, such that all the terminal posts can be welded in a subsequent welding process.

In the embodiments of the present disclosure, the target addressing coordinates of the cell terminal posts are obtained by calculation on the initial addressing coordinates and the positioning deviation values of the cell terminal posts, thereby improving the addressing accuracy for the cell terminal posts.

In some embodiments, after the target addressing coordinates of the cell terminal posts are determined, the pre-welding addressing method further includes the following steps. First, the fixing component in the three-axis positioning mechanism is controlled to be disengaged from the positioning component of the battery pack, which may be controlling the three-axis positioning mechanism to move upwards along the z axis, such that the fixing component is disengaged from the positioning component of the battery pack.

Then a jacking mechanism on the frame body is controlled to perform a first jacking action, in response to the fixing component being disengaged from the positioning component, so as to lower the to-be-addressed battery pack to a preset height and place the to-be-addressed battery pack onto a transport trolley.

The first jacking action may refer to the controller controlling a cylinder to jack up the jacking mechanism, and lowering the to-be-addressed battery pack to the preset height, where the preset height may be a height of the top of the transport trolley, such that the jacking mechanism places the battery pack onto the transport trolley (i.e., the AGV trolley), and the transport trolley brings the battery pack away from the pre-welding addressing station after addressing, such that the pre-welding addressing for the battery pack is completed. In this way, when the pre-welding addressing for the battery pack is completed, the battery pack is automatically brought away from the pre-welding addressing station, implementing automated addressing for the battery pack, thereby improving the pre-welding addressing efficiency.

Figure 3:
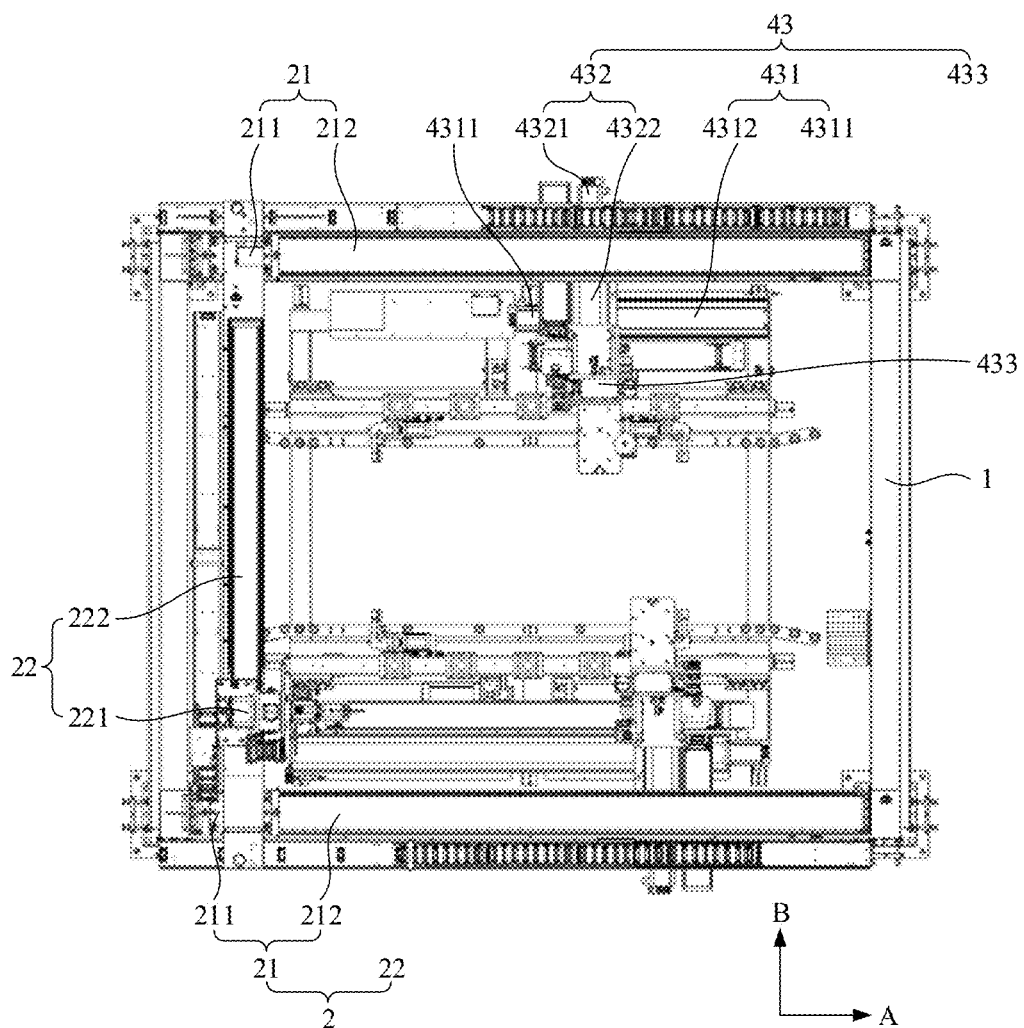
FIG. 3 is a schematic top view of a structure of a pre-welding addressing system according to an embodiment of the present disclosure.
Figure 4:
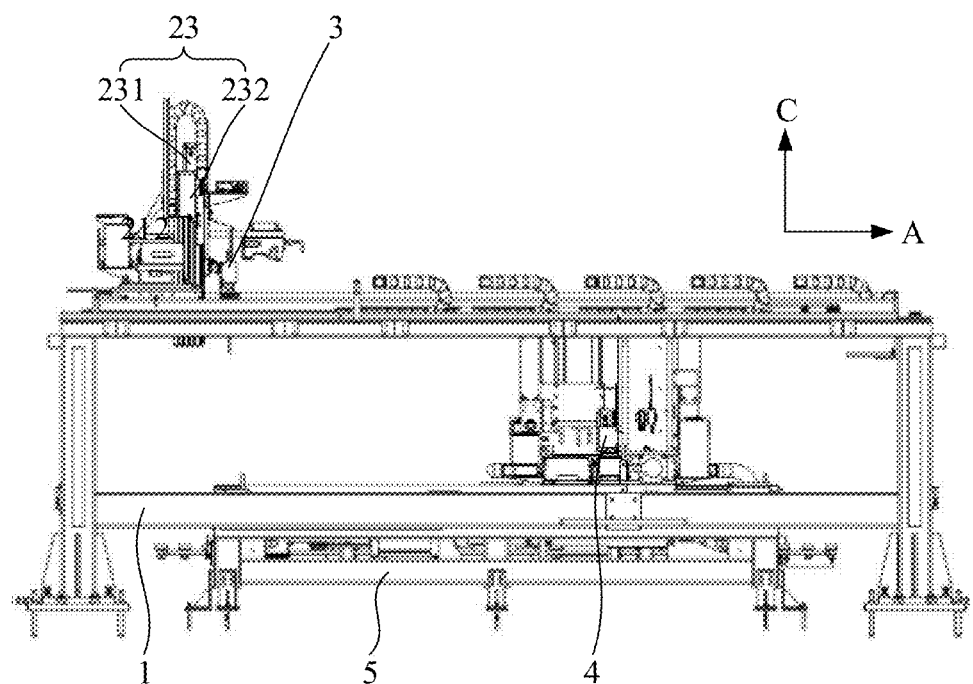
FIG. 4 is a schematic front view of a structure of a pre-welding addressing system according to an embodiment of the present disclosure.
Figure 5:
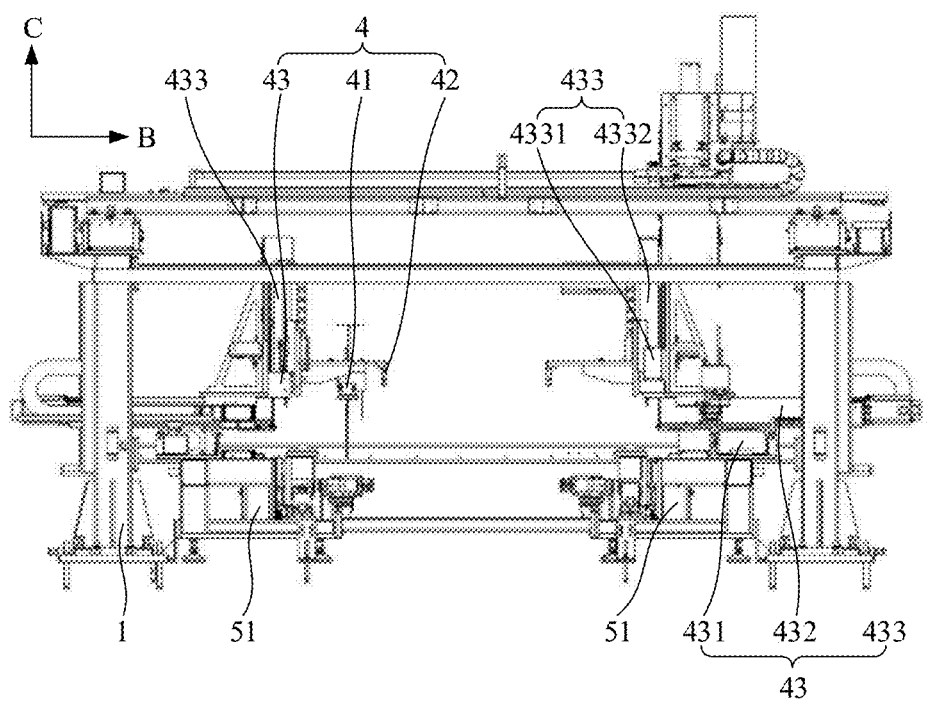
FIG. 5 is a schematic left view of a structure of a pre-welding addressing system according to an embodiment of the present disclosure.

Next, the embodiments of the present disclosure further provide a pre-welding addressing system, with reference to FIGS. 3, 4, and 5, which are schematic top, front, and left views, respectively, of a structure of a pre-welding addressing system according to an embodiment of the present disclosure. The pre-welding addressing system includes: a frame body 1, a controller (not shown), a three-axis addressing mechanism 2, and an addressing camera module 3, where the three-axis addressing mechanism 2 is mounted on the frame body 1, and the three-axis addressing mechanism 2 is capable of generating a movement relative to the frame body 1; the addressing camera module 3 is mounted on the three-axis addressing mechanism 2; and the addressing camera module 3 is movable relative to the frame body 1 as driven by the three-axis addressing mechanism 2.

The controller is electrically connected to the three-axis addressing mechanism 2 and is configured to obtain product information of a to-be-addressed battery pack, in response to the to-be-addressed battery pack getting in position, where the battery pack includes a plurality of cells, and the product information includes initial addressing coordinates of a plurality of cell terminal posts. The controller is further configured to obtain positioning deviation values of the plurality of cell terminal posts based respectively on the initial addressing coordinates of the plurality of cell terminal posts, where the positioning deviation values of the cell terminal posts are determined based on addressing images of the cell terminal posts that are acquired by the addressing camera module 3. The controller is further configured to determine target addressing coordinates of the plurality of cell terminal posts based respectively on the initial addressing coordinates of the plurality of cell terminal posts and the positioning deviation values of the plurality of cell terminal posts.

In the embodiments of the present disclosure, prior to welding of the cell terminal posts in the battery pack, the target addressing coordinates of the cell terminal posts need to be determined first, such that the cell terminal posts can be welded based on the obtained target addressing coordinates. Therefore, the pre-welding addressing system may be provided by which the target addressing coordinates of the cell terminal posts are determined.

In the embodiments of the present disclosure, the frame body 1 may be arranged in the pre-welding addressing system, and the frame body 1 may be configured as a cubic structure. For example, tubes may be used and fixedly connected by fasteners to form the cubic frame body 1. Other components in the pre-welding addressing system may be arranged and mounted on the frame body 1, or the pre-welding addressing system may be fixedly mounted at the corresponding addressing station by the frame body 1.

In the embodiments of the present disclosure, current positions of the cell terminal posts in the battery pack may be determined by visual addressing, for example, by photographing of the cell terminal posts to obtain the addressing images of the cell terminal posts. Then the preset initial addressing coordinates of the cell terminal posts in the battery pack are obtained, and the target addressing coordinates of the cell terminal posts can be determined by comparing the coordinates of the cell terminal posts in the addressing images to the initial addressing coordinates.

In some embodiments, the addressing camera module 3 may be configured to include cameras capable of acquiring images, and may include two cameras. A vision driving member and a vision sliding assembly may be further provided in the addressing camera module 3. One of the cameras may be slidably connected to the three-axis addressing mechanism 2 via the vision sliding assembly, and the other one of the cameras may be fixed to the three-axis addressing mechanism 2. For example, the vision sliding assembly is configured as a guide rail and a slider extending in a second direction B, the guide rail is fixed to the three-axis addressing mechanism 2, and one of the cameras is fixed to the slider. The vision driving member is arranged on the three-axis addressing mechanism 2, and an output shaft of the vision driving member is connected to the slider in the vision sliding assembly, such that one of the cameras can be driven to move in the second direction B by the vision driving member. This allows two cell terminal posts to be photographed simultaneously by adjusting the distance between the two cameras.

In this embodiment of the present disclosure, since the battery pack has a plurality of cell terminal posts, the addressing camera module 3 needs to move during photographing of the cell terminal posts. Therefore, the three-axis addressing mechanism 2 may be arranged in the pre-welding addressing system, the three-axis addressing mechanism 2 may be fixedly mounted on the frame body 1, and the three-axis addressing mechanism 2 may be configured to be capable of generating a movement relative to the frame body 1. The addressing camera module 3 is fixed to the three-axis addressing mechanism 2, and therefore the addressing camera module 3 can be driven to move to positions corresponding to different cell terminal posts by the three-axis addressing mechanism 2 so as to obtain visual images of the cell terminal posts.

In the above embodiments, the frame body 1 is arranged in the pre-welding addressing system, such that the components in the pre-welding addressing system can be carried and mounted on the frame body 1, and the pre-welding addressing system can be fixedly mounted at the corresponding addressing station. Also, the addressing camera module 3 is provided, which can obtain visual images of the cell terminal posts in the battery pack, the target addressing coordinates of the cell terminal posts can be determined based on the obtained visual images and preset initial addressing coordinates of the cell terminal posts. In addition, the three-axis addressing mechanism 2 is arranged on the frame body 1, and the addressing camera module 3 is arranged on the three-axis addressing mechanism 2, such that the addressing camera module 3 can be driven to move to different positions by the three-axis addressing mechanism 2, such that the visual images of the cell terminal posts in the battery pack can be obtained, thereby further determining the target addressing coordinates of the cell terminal posts efficiently and quickly.

In some embodiments, as shown in FIGS. 3, 4, and 5, the three-axis addressing mechanism 2 may be configured to include: a transverse addressing driving assembly 21, a longitudinal addressing driving assembly 22, and a vertical addressing driving assembly 23. The transverse addressing driving assembly 21 is arranged on the frame body 1 and is capable of generating a movement in a first direction A relative to the frame body 1. The longitudinal addressing driving assembly 22 is connected to the transverse addressing driving assembly 21 and is capable of generating a movement in the second direction B relative to the frame body 1. The vertical addressing driving assembly 23 is connected to the longitudinal addressing driving assembly 22 and is capable of generating a movement in a third direction C relative to the frame body 1. The addressing camera module 3 is fixed to the vertical addressing driving assembly 23. There is an included angle between the first direction A and the second direction B, and both the first direction A and the second direction B are perpendicular to the third direction C. The controller may be separately electrically connected to the transverse addressing driving assembly 21, the longitudinal addressing driving assembly 22, and the vertical addressing driving assembly 23, so as to control the addressing camera module 3 to acquire addressing images of the cell terminal posts.

In this embodiment of the present disclosure, in order to enable the addressing camera module 3 to move to different positions, the driving assemblies capable of moving in a plurality of directions may be arranged in the three-axis addressing mechanism 2, such that the addressing camera module 3 can be driven to move to different positions in space. For example, the addressing camera module 3 can be driven to move respectively in the first direction A, the second direction B, and the third direction C perpendicular to each other by the three-axis addressing mechanism 2.

In this embodiment of the present disclosure, the transverse addressing driving assembly 21 may be arranged in the three-axis addressing mechanism 2, the transverse addressing driving assembly 21 is fixed to the frame body 1, and the transverse addressing driving assembly 21 is capable of generating the movement in the first direction A, such that the addressing camera module 3 can be driven to move in the first direction A.

In some embodiments, the transverse addressing driving assembly 21 may be configured to include a transverse addressing driving member 211 and a transverse addressing sliding assembly 212. For example, the transverse addressing sliding assembly 212 may use a transverse addressing guide rail and a transverse addressing slider that match each other. The transverse addressing guide rail is fixed to the frame body 1 and extends in the first direction A. The transverse addressing slider is slidably mounted on the transverse addressing guide rail. Two sets of transverse addressing sliding assemblies 212 may be provided, and the two sets of transverse addressing sliding assemblies 212 are arranged both in the first direction A in parallel.

In some embodiments, the transverse addressing driving member 211 may be configured to include a first driving member and a first ball screw. For example, the first driving member may use a first servo motor that is connected to a screw in the first ball screw, and a nut in the first ball screw is connected to the transverse addressing slider. As such, during the rotation of the first servo motor, the screw can be driven into rotation, such that the nut sleeved on the screw can be driven to move in an axial direction of the screw, and in this way, the transverse addressing slider can be driven to move, thereby generating the movement in the first direction A.

In this embodiment of the present disclosure, the longitudinal addressing driving assembly 22 may be further arranged in the three-axis addressing mechanism 2, the longitudinal addressing driving assembly 22 is fixed to the transverse addressing slider in the transverse addressing driving assembly 21, and the longitudinal addressing driving assembly 22 is capable of generating the movement in the second direction B, such that the addressing camera module 3 can be driven to move in the second direction B.

In some embodiments, the longitudinal addressing driving assembly 22 may be configured to include a longitudinal addressing driving member 221 and a longitudinal addressing sliding assembly 222. For example, the longitudinal addressing sliding assembly 222 may use a longitudinal addressing guide rail and a longitudinal addressing slider that match each other. The longitudinal addressing guide rail is fixed to the transverse addressing slider in the transverse addressing driving assembly 21 and extends in the second direction B. The longitudinal addressing slider is slidably mounted on the longitudinal addressing guide rail.

In some embodiments, the longitudinal addressing driving member 221 may be configured to include a second driving member and a second ball screw. For example, the second driving member may use a second servo motor that is connected to a screw in the second ball screw, and a nut in the second ball screw is connected to the longitudinal addressing slider. As such, during the rotation of the second servo motor, the screw can be driven into rotation, such that the nut sleeved on the screw can be driven to move in an axial direction of the screw, and in this way, the longitudinal addressing slider can be driven to move, thereby generating the movement in the second direction B.

In this embodiment of the present disclosure, the vertical addressing driving assembly 23 may be further arranged in the three-axis addressing mechanism 2 the vertical addressing driving assembly 23 is fixed to the longitudinal addressing slider in the longitudinal addressing driving assembly 22, and the vertical addressing driving assembly 23 is capable of generating the movement in the third direction C, such that the addressing camera module 3 can be driven to move in the third direction C.

In some embodiments, the vertical addressing driving assembly 23 may be configured to include a vertical addressing driving member 231 and a vertical addressing sliding assembly 232. For example, the vertical addressing sliding assembly 232 may use a vertical addressing guide rail and a vertical addressing slider that match each other. The vertical addressing guide rail is fixed to the longitudinal addressing slider in the longitudinal addressing driving assembly 22 and extends in the third direction C. The vertical addressing slider is slidably mounted on the vertical addressing guide rail.

In some embodiments, the vertical addressing driving member 231 may be configured to include a third driving member and a third ball screw. For example, the third driving member may use a third servo motor that is connected to a screw in the third ball screw, and a nut in the third ball screw is connected to the vertical addressing slider. As such, during the rotation of the third servo motor, the screw can be driven into rotation, such that the nut sleeved on the screw can be driven to move in an axial direction of the screw, and in this way, the vertical addressing slider can be driven to move, thereby generating the movement in the third direction C.

In the above embodiments, the transverse addressing driving assembly 21 is arranged in the three-axis addressing mechanism 2, such that the addressing camera module 3 can be driven to move in the first direction A by the transverse addressing driving assembly 21. The longitudinal addressing driving assembly 22 is arranged on the transverse addressing driving assembly 21, such that the addressing camera module 3 can be driven to move in the second direction B by the longitudinal addressing driving assembly 22. In addition, the vertical addressing driving assembly 23 is arranged on the longitudinal addressing driving assembly 22, and the addressing camera module 3 is fixed to the vertical addressing driving assembly 23, such that the addressing camera module 3 can be driven to move in the third direction C by the vertical addressing driving assembly 23. As such, the addressing camera module 3 can move to a desired position in space so as to obtain visual images of all the cell terminal posts in the battery pack.

In some embodiments, the addressing camera module 3 is further configured to acquire a plurality of addressing images corresponding to the plurality of cell terminal posts respectively at the initial addressing coordinates of the plurality of cell terminal posts, and determine the positioning deviation values of the plurality of cell terminal posts based on the plurality of acquired addressing images; or the controller is further configured to: obtain a plurality of addressing images corresponding to the plurality of cell terminal posts acquired by the addressing camera module based respectively on the initial addressing coordinates of the plurality of cell terminal posts; and determine the positioning deviation values of the plurality of cell terminal posts based on the plurality of addressing images.

The addressing camera module 3 includes at least two addressing acquisition cameras. The controller is further configured to control a distance between visual centers of the two addressing acquisition cameras to be a standard distance between two cell terminal posts in the cell. The controller is further configured to control the three-axis addressing mechanism 2 to drive the two addressing acquisition cameras to move, starting from initial addressing coordinates of two cell terminal posts in a last cell of the battery pack, to initial addressing coordinates of two cell terminal posts in a next cell. The two addressing acquisition cameras are configured to acquire images of the two cell terminal posts of the next cell, such that the plurality of addressing images are finally obtained.

In some embodiments, as shown in FIGS. 3, 4, and 5, a three-axis positioning mechanism 4 may be further provided in the pre-welding addressing system, and the three-axis positioning mechanism 4 includes: a positioning driving assembly 43, a fixing component 42, and a positioning camera module 41, where the positioning driving assembly 43 is arranged on the frame body 1; the fixing component 42 is arranged on the positioning driving assembly 43; the positioning camera module 41 is arranged on the positioning driving assembly 43 at a position aligned with the fixing component 42; and the positioning driving assembly 43 is configured to drive the fixing component 42 and the positioning camera module 41 to move.

The controller can be electrically connected to the positioning driving assembly 43, and the controller is further configured to control the three-axis positioning mechanism 4 to move to a first preset position based on the product information. The positioning camera module 41 is configured to acquire an image of a positioning component of the battery pack at the first preset position. The controller is further configured to: obtain a positioning deviation value, between the positioning component and a preset reference point, determined based on the acquired positioning image; and control the three-axis positioning mechanism 4 to drive the fixing component 42 to the positioning component based on the positioning deviation value between the positioning component and the preset reference point so as to fix the battery pack to the frame body by the fixing component 42.

In this embodiment of the present disclosure, it is required to have the battery pack fixed in position relative to the pre-welding addressing system prior to acquiring visual images of the cell terminal posts in the battery pack. Therefore, the three-axis positioning mechanism 4 may be arranged in the pre-welding addressing system, and after the battery pack is placed in a position corresponding to the three-axis addressing mechanism 2, the battery pack may first be positioned by the three-axis positioning mechanism 4. Since different battery packs may have different sizes and shapes, in positioning of different battery packs, it is required to first determine the position of the positioning component for positioning on the battery pack, and then control the three-axis positioning mechanism 4 to position the positioning component so as to fixedly connect the battery pack to the frame body 1. For example, two sets of three-axis positioning mechanisms 4 may be arranged respectively on two sides of the battery pack, such that the battery pack may be positioned at two positions.

In this embodiment of the present disclosure, the positioning camera module 41 may be arranged in the three-axis positioning mechanism 4, such that an accurate position of the positioning component on the battery pack can be obtained by the positioning camera module 41. For example, the positioning camera module 41 may be configured to include a camera by which a visual image of the positioning component can be acquired, such that the accurate position of the positioning component in the acquired image can be determined from the image.

In this embodiment of the present disclosure, the positioning driving assembly 43 may be arranged in the three-axis positioning mechanism 4, the positioning driving assembly 43 may be arranged on the frame body 1, and the positioning driving assembly 43 is capable of generating movements in a plurality of directions relative to the frame body 1. The positioning camera module 41 and the fixing component 42 matching the positioning component are both arranged on the positioning driving assembly 43, such that the positioning camera module 41 and the fixing component 42 can be driven to move by the positioning driving assembly 43.

In this embodiment of the present disclosure, the fixing component 42 may be arranged in the three-axis positioning mechanism 4, and the fixing component 42 may be configured to match the positioning component on the battery pack. For example, when the positioning component is a positioning through-hole on a case of the battery pack, the fixing component 42 may be configured as a positioning rod matching the positioning through-hole, such that the positioning rod may be inserted into the positioning through-hole as driven by the positioning driving assembly 43 so as to implement the positioning of the battery pack.

In the above embodiments, the positioning camera module 41 is arranged in the three-axis positioning mechanism 4, such that the visual image of the positioning component on the battery pack can be obtained by the positioning camera module 41, thereby determining an accurate position of the positioning component. Also, the fixing component 42 that matches the positioning component is provided. The fixing component 42 can be connected to the positioning component to position the battery pack, such that the battery pack is located at a fixed position relative to the frame body 1. In addition, the positioning driving assembly 43 is provided, and can drive the fixing component 42 and the positioning camera module 41 to move to a position corresponding to the positioning component on the battery pack. As such, positions of positioning components on different battery packs can be determined quickly and accurately, such that the battery packs can be positioned by the fixing component 42.

In some embodiments, as shown in FIGS. 3, 4, and 5, the positioning driving assembly 43 may be configured to include: a transverse positioning driving assembly 431, a longitudinal positioning driving assembly 432, and a vertical positioning driving assembly 433. The transverse positioning driving assembly 431 is arranged on the frame body 1 and is capable of generating a movement in the first direction A relative to the frame body 1. The longitudinal positioning driving assembly 432 is connected to the transverse positioning driving assembly 431 and is capable of generating a movement in the second direction B relative to the frame body 1. The vertical positioning driving assembly 433 is connected to the longitudinal positioning driving assembly 432 and is capable of generating a movement in the third direction C relative to the frame body 1. Both the positioning camera module 41 and the fixing component 42 are fixed to the vertical positioning driving assembly 433. There is an included angle between the first direction A and the second direction B, and both the first direction A and the second direction B are perpendicular to the third direction C.

In this embodiment of the present disclosure, in order to enable the positioning camera module 41 and the fixing component 42 to move to different positions, the driving assemblies capable of moving in a plurality of directions may be arranged in the three-axis positioning mechanism 4, such that the positioning camera module 41 and the fixing component 42 can be driven to move to different positions in space. For example, the positioning camera module 41 and the fixing component 42 can be driven to move respectively in the first direction A, the second direction B, and the third direction C perpendicular to each other by the three-axis positioning mechanism 4.

In this embodiment of the present disclosure, the transverse positioning driving assembly 431 may be arranged in the three-axis positioning mechanism 4, the transverse positioning driving assembly 431 is fixed to the frame body 1, and the transverse positioning driving assembly 431 is capable of generating the movement in the first direction A, such that the positioning camera module 41 can be driven to move in the first direction A.

In some embodiments, the transverse positioning driving assembly 431 may be configured to include a transverse positioning driving member 4311 and a transverse positioning sliding assembly 4312. For example, the transverse positioning sliding assembly 4312 may use a transverse positioning guide rail and a transverse positioning slider that match each other. The transverse positioning guide rail is fixed to the frame body 1 and extends in the first direction A. The transverse positioning slider is slidably mounted on the transverse positioning guide rail.

In some embodiments, the transverse positioning driving member 4311 may be configured to include a fourth driving member and a fourth ball screw. For example, the fourth driving member may use a fourth servo motor that is connected to a screw in the fourth ball screw, and a nut in the fourth ball screw is connected to the transverse positioning slider. As such, during the rotation of the fourth servo motor, the screw can be driven into rotation, such that the nut sleeved on the screw can be driven to move in an axial direction of the screw, and in this way, the transverse positioning slider can be driven to move, thereby generating the movement in the first direction A.

In this embodiment of the present disclosure, the longitudinal positioning driving assembly 432 may be arranged in the three-axis positioning mechanism 4 as well, the longitudinal positioning driving assembly 432 is fixed to the transverse positioning slider in the transverse positioning driving assembly 431, and the longitudinal positioning driving assembly 432 is capable of generating the movement in the second direction B, such that the positioning camera module 41 can be driven to move in the second direction B.

In some embodiments, the longitudinal positioning driving assembly 432 may be configured to include a longitudinal positioning driving member 4321 and a longitudinal positioning sliding assembly 4322. For example, the longitudinal positioning sliding assembly 4322 may use a longitudinal positioning guide rail and a longitudinal positioning slider that match each other. The longitudinal positioning guide rail is fixed to the transverse positioning slider and extends in the second direction B. The longitudinal positioning slider is slidably mounted on the longitudinal positioning guide rail.

In some embodiments, the longitudinal positioning driving member 4321 may be configured to include a fifth driving member and a fifth ball screw. For example, the fifth driving member may use a fifth servo motor that is connected to a screw in the fifth ball screw, and a nut in the fifth ball screw is connected to the longitudinal positioning slider. As such, during the rotation of the fifth servo motor, the screw can be driven into rotation, such that the nut sleeved on the screw can be driven to move in an axial direction of the screw, and in this way, the longitudinal positioning slider can be driven to move, thereby generating the movement in the second direction B.

In this embodiment of the present disclosure, the vertical positioning driving assembly 433 may be arranged in the three-axis positioning mechanism 4 as well, the vertical positioning driving assembly 433 is fixed to the longitudinal positioning slider in the longitudinal positioning driving assembly 432, and the vertical positioning driving assembly 433 is capable of generating the movement in the third direction C, such that the positioning camera module 41 and the fixing component 42 can be driven to move in the third direction C.

In some embodiments, the vertical positioning driving assembly 433 may be configured to include a vertical positioning driving member 4331 and a vertical positioning sliding assembly 4332. For example, the vertical positioning sliding assembly 4332 may use a vertical positioning guide rail and a vertical positioning slider that match each other. The vertical positioning guide rail is fixed to the longitudinal positioning slider and extends in the third direction C. The vertical positioning slider is slidably mounted on the vertical positioning guide rail.

In some embodiments, the vertical positioning driving member 4331 may be configured to include a sixth driving member and a sixth ball screw. For example, the sixth driving member may use a sixth servo motor that is connected to a screw in the sixth ball screw, and a nut in the sixth ball screw is connected to the vertical positioning slider. Both the positioning camera module 41 and the fixing component 42 are fixed to the vertical positioning slider. As such, during the rotation of the sixth servo motor, the screw can be driven into rotation, such that the nut sleeved on the screw can be driven to move in an axial direction of the screw, and in this way, the vertical positioning slider can be driven to move, thereby generating the movement in the third direction C.

In the above embodiments, the transverse positioning driving assembly 431 is arranged in the three-axis positioning mechanism 4, such that the positioning camera module 41 and the fixing component 42 can be driven to move in the first direction A by the transverse positioning driving assembly 431. The longitudinal positioning driving assembly 432 is arranged on the transverse positioning driving assembly 431, such that the positioning camera module 41 and the fixing component 42 can be driven to move in the second direction B by the longitudinal positioning driving assembly 432. In addition, the vertical positioning driving assembly 433 is arranged on the longitudinal positioning driving assembly 432, and both the positioning camera module 41 and the fixing component 42 are fixedly connected to the vertical positioning driving assembly 433, such that the positioning camera module 41 and the fixing component 42 can be driven to move in the third direction C by the vertical positioning driving assembly 433. As such, the positioning camera module 41 and the fixing component 42 can move to a desired position in space so as to obtain a visual image of the positioning component on the battery pack and control the fixing component 42 to be connected to the positioning component, such that the battery pack can be positioned quickly and accurately.

Figure 6:
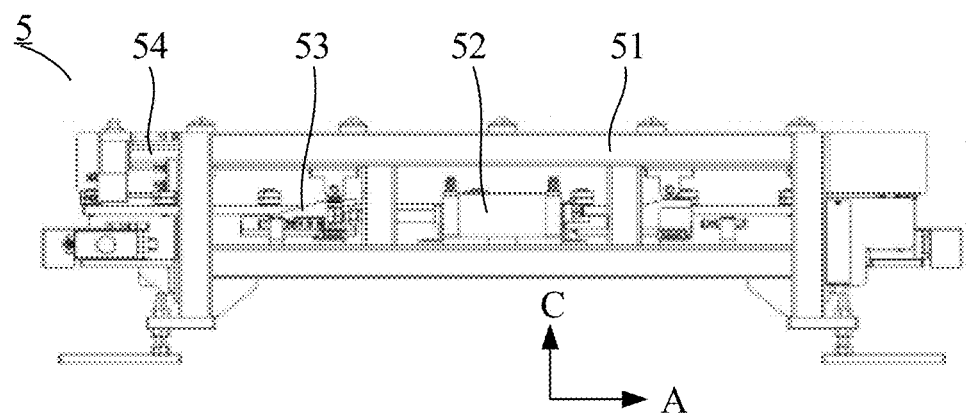
FIG. 6 is a schematic front view of a structure of a jacking mechanism in a pre-welding addressing system according to an embodiment of the present disclosure.

In some embodiments, a jacking mechanism 5 may be further provided in the pre-welding addressing system, and the jacking mechanism 5 is arranged on the frame body 1, with reference to FIG. 6, which is a schematic front view of a structure of a jacking mechanism in a pre-welding addressing system according to an embodiment of the present disclosure. The jacking mechanism 5 includes: a jacking driving member 52, a jacking transmission member 53, and a jacking beam 54, where one end of the jacking driving member 52 is connected to the frame body 1; the jacking transmission member 53 is slidably connected to the frame body 1, and the other end of the jacking driving member 52 is connected to the jacking transmission member 53; the jacking beam 54 is slidably connected to the frame body 1 and is in transmission connection with the jacking transmission member 53; and the jacking transmission member 53 is capable of driving the jacking beam 54 to move in the third direction C when the jacking driving member 52 drives the jacking transmission member 53 to move.

The controller is further configured to control the fixing component 42 in the three-axis positioning mechanism 4 to be disengaged from the positioning component of the battery pack. The jacking mechanism 5 is configured to lower the to-be-addressed battery pack to a preset height and place the to-be-addressed battery pack onto a transport trolley, in response to the fixing component 42 being disengaged from the positioning component.

In this embodiment of the present disclosure, the jacking mechanism 5 may be arranged in the pre-welding addressing system so as to facilitate transportation and support of the battery pack. When the battery pack is transported by the transport trolley to the position corresponding to the pre-welding addressing system, the battery pack may be jacked up to a height by the jacking mechanism 5 so as to separate the transport trolley from the battery pack, such that the transport trolley can perform another task.

In this embodiment of the present disclosure, in order to facilitate arrangement and mounting of the jacking mechanism 5, a jacking support 51 may be provided, which is fixedly connected to the frame body 1. The jacking beam 54 may be arranged in the jacking mechanism 5, the jacking beam 54 may be configured as a bar-shaped columnar structure, and the columnar jacking beam 54 may be slidably connected to the jacking support 51. For example, a guide rail and a slider, which are slidably connected, may be used. The guide rail is fixed to the jacking support 51, and the jacking beam 54 is fixedly connected to the slider, such that the jacking beam 54 is slidably connected to the jacking support 51. The jacking beam 54 may be configured to slide in the third direction C, and two parallel jacking beams 54 may be arranged on the jacking support 51 to support the battery pack on two sides of the battery pack.

In some embodiments, the jacking transmission member 53 may be slidably arranged on the jacking support 51. For example, a guide rail is fixedly arranged on the jacking support 51, and a sliding slot matching the guide rail is arranged on the jacking transmission member 53, such that the jacking transmission member 53 may be slidably connected to the jacking support 51 via the sliding slot and the guide rail. The jacking transmission member 53 may be configured as a wedge block having an inclined surface. The inclined surface may be in transmission connection with the jacking beam 54, such that the jacking beam 54 can generate a movement in the third direction C under the action of the inclined surface, during the movement of the jacking transmission member 53 along the long axis thereof.

In some embodiments, the jacking driving member 52 may be configured to include a driving cylinder. A cylinder barrel of the driving cylinder is connected to the jacking support 51, and a piston rod of the driving cylinder is connected to the jacking transmission member 53. Therefore, the jacking transmission member 53 can be driven to move by the driving cylinder.

In the above embodiments, the jacking beam 54 slidably connected to the frame body 1 is arranged in the jacking mechanism 5, such that the battery pack can be carried and supported by the jacking beam 54. The jacking transmission member 53 is slidably arranged on the frame body 1, and the jacking driving member 52 connected to the jacking transmission member 53 is arranged on the frame body 1, such that the jacking transmission member 53 can be driven to move by the jacking driving member 52 so as to drive the jacking beam 54 to move in the third direction C. As such, when the battery pack is located at the position corresponding to the jacking mechanism 5, the battery pack can be jacked up to move in the third direction C by the jacking mechanism 5, such that the battery pack can be separated from the transport trolley or placed onto the transport trolley.

In the following, exemplary application of embodiments of the present disclosure will be described in a practical application scenario.

The present disclosure provides a pre-welding addressing method for a battery pack. First, a battery pack product (i.e., a to-be-addressed battery pack) is transported to a pre-welding addressing station by an AGV trolley (i.e., a transport trolley) to interact with a PLC (i.e., a controller). The PLC obtains a fixed serial number of the current battery pack product. After identifying the product serial number, the PLC sends the serial number to an upper computer to trigger station entry. The upper computer then delivers blueprint data (i.e., product information) of the product based on a product type corresponding to the product serial number, where the blueprint data includes at least coordinates of terminal posts and a mark point.

Figure 7:
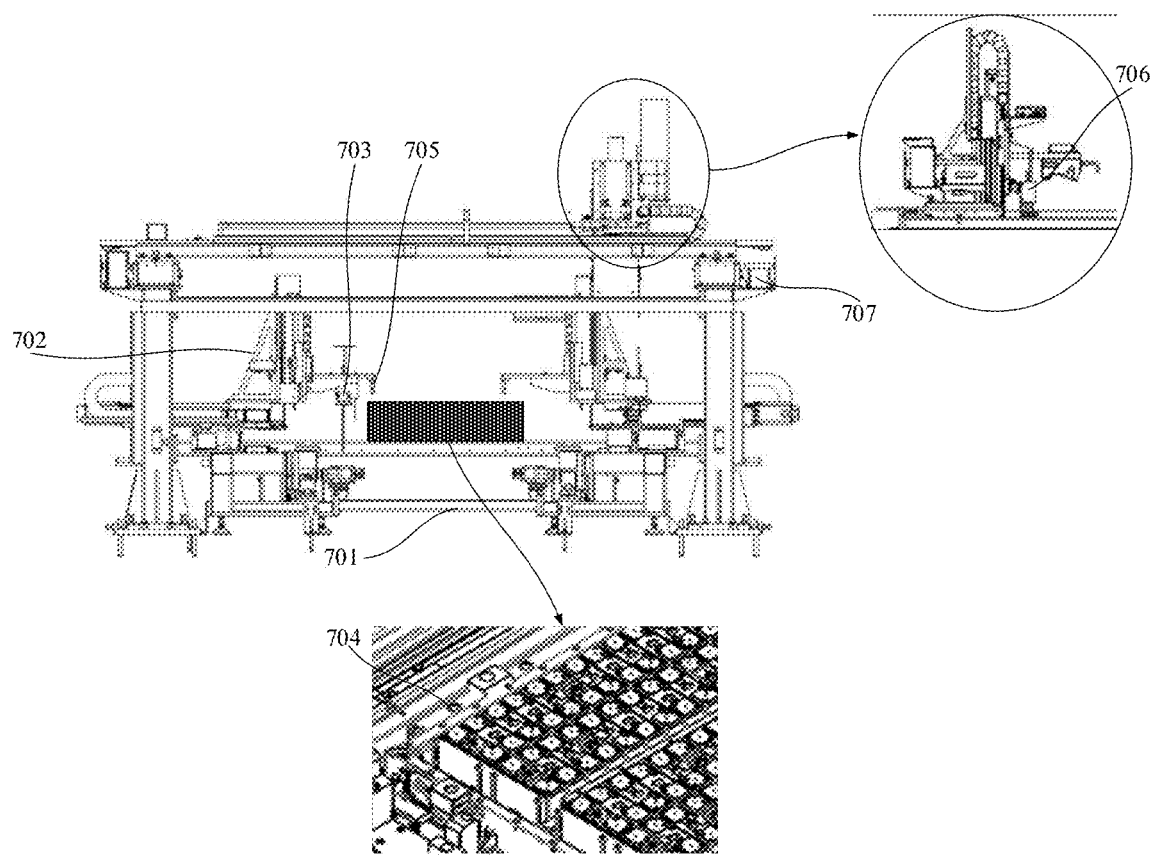
FIG. 7 is a schematic diagram of a structure of a pre-welding addressing system according to an embodiment of the present disclosure.

FIG. 7 is a schematic diagram of a structure of a pre-welding addressing system according to an embodiment of the present disclosure. With reference to FIG. 7, after the AGV trolley enters the station, the product is jacked up by a jacking structure 701. Two sets of three-axis pull-pin mechanisms 702 (i.e., three-axis positioning mechanisms) act synchronously based on the corresponding formula (i.e., the product information), in each of which a three-axis pull-pin camera 703 (i.e., a positioning camera module) is driven in X, Y and Z axes to a fixed photographing position (i.e., a first preset position) to photograph a case hole 704 (i.e., a positioning component) on the pack; a pull pin 705 (i.e., a fixing component) is then accurately compensated by visual deviation feedback, and the pull pin 705 is driven in the X and Y axes to move to a position directly above the case hole 704, and the three-axis pull-pin mechanism 702 moves downwards in the Z axis such that the pull pin 705 is accurately inserted into the case hole 704. Then each of the two sets of three-axis pull-pin mechanisms 702 independently moves in the X and Y axes to drive, via the pull pin 705, the pack product to move to a preset deviation correction position (i.e., an addressing position) synchronously, thereby completing the positioning of the entire pack.

Two addressing cameras 706 (i.e., addressing acquisition cameras) have the distance therebetween automatically changed through a servo motor 707. The terminal post position coordinates (i.e., initial addressing coordinates) in the blueprint data are standard coordinates of the battery pack. However, in the manufacturing process, the terminal post positions may deviate, so the terminal post coordinates of the battery pack are coordinate deviations relative to reference positions. Therefore, a gantry three-axis mechanism (i.e., a three-axis addressing mechanism) carries the addressing cameras 706 to photographing positions for photographing based on the coordinate deviations and the terminal post position coordinates in the blueprint data, thereby completing accurate addressing of the mark point and all the terminal post coordinates of the current product.

After the addressing is completed, the battery pack is driven to move to the position of the pull pin by the three-axis pull-pin mechanisms 702 where the pull pin 705 is driven to move out of the case hole 704 in the Z axis. Then the three-axis pull-pin mechanisms 702 return to original positions, and the battery pack is lowered onto the trolley by the jacking mechanism and then exits from the station.

The embodiments of the present disclosure implement compatibility of a plurality of pieces of blueprint data in one pre-welding addressing system and rapid automatic switching by identification of fixed serial numbers of battery products, automatic retrieval of product formulas, and accurate positioning and addressing for battery packs, thereby reducing device development costs and switching costs.

In the pre-welding addressing system provided in the embodiments of the present disclosure, first, the hardware or software in the device does not need to be replaced or debugged when it is required to switch to another blueprint for production; a corresponding formula is automatically retrieved through a fixed serial number of a battery product; the battery product is first positioned by a three-axis positioning pull-pin mechanism under visual guidance; two addressing cameras automatically change the distance therebetween synchronously; and a gantry three-axis mechanism carries the addressing cameras to accurately address positions of a mark point and all cell terminal posts, thereby achieving a high compatibility and rapid automatic switching of a plurality of blueprints. Next, the pre-welding addressing system is simple in structure and easy to mount, debug, and maintain. Finally, labor costs and time costs for switching can be significantly reduced.

It should be noted that the description of the system in the embodiments of the present disclosure is similar to the description of the above method embodiments, and has similar beneficial effects as the method embodiments, which is therefore not repeated herein. Reference may be made to the description of the method embodiments in the present disclosure for technical details not disclosed in the system embodiments.

The above description shows merely embodiments of the present disclosure and is not intended to limit the protection scope of the present disclosure. Any modification, equivalent substitution, and improvement made within the spirit and scope of the present disclosure shall fall within the protection scope of the present disclosure.

INDUSTRIAL APPLICABILITY

Embodiments of the present disclosure provide a pre-welding addressing method and system, which can automatically retrieve initial addressing coordinates of a plurality of terminal posts in various battery packs based on product information of the battery packs, and thus implement accurate addressing of the terminal posts based on initial addressing coordinates, thereby solving the problem of low addressing efficiency caused by the inability to determine a distance for each movement of a camera.

What is claimed is:

1. A pre-welding addressing method, applied to a controller of a pre-welding addressing system, wherein the pre-welding addressing system further comprises a frame body, a three-axis addressing mechanism arranged on the frame body, and an addressing camera module arranged on the three-axis addressing mechanism, and the pre-welding addressing method comprises:
obtaining product information of a to-be-addressed battery pack, in response to the battery pack getting in position, wherein the battery pack comprises a plurality of cells, and the product information comprises initial addressing coordinates of a plurality of cell terminal posts;
obtaining positioning deviation values of the plurality of cell terminal posts based respectively on the initial addressing coordinates of the plurality of cell terminal posts, wherein the positioning deviation values of the cell terminal posts are determined based on addressing images of the cell terminal posts that are acquired by the addressing camera module; and
determining target addressing coordinates of the plurality of cell terminal posts based respectively on the initial addressing coordinates of the plurality of cell terminal posts and the positioning deviation values of the plurality of cell terminal posts.

2. The pre-welding addressing method according to claim 1, wherein the pre-welding addressing system further comprises a three-axis positioning mechanism arranged on the frame body, the three-axis positioning mechanism comprises at least a fixing component and a positioning camera module, and the pre-welding addressing method further comprises:
controlling the three-axis positioning mechanism to move to a first preset position based on the product information, such that the positioning camera module acquires an image of a positioning component of the battery pack after the three-axis positioning mechanism reaches the first preset position;
obtaining a positioning deviation value, between the positioning component and a preset reference point, determined based on the acquired positioning image; and
controlling the three-axis positioning mechanism to drive the fixing component to the positioning component based on the positioning deviation value between the positioning component and the preset reference point so as to fix the battery pack to the frame body by the fixing component.

3. The pre-welding addressing method according to claim 1, wherein the obtaining positioning deviation values of the plurality of cell terminal posts based respectively on the initial addressing coordinates of the plurality of cell terminal posts comprises:
controlling the three-axis addressing mechanism to drive the addressing camera module to acquire a plurality of addressing images corresponding to the plurality of cell terminal posts respectively at the initial addressing coordinates of the plurality of cell terminal posts, and obtaining the positioning deviation values of the plurality of cell terminal posts that are determined by the addressing camera module based respectively on the plurality of acquired addressing images;
or
obtaining a plurality of addressing images corresponding to the plurality of cell terminal posts acquired by the addressing camera module, based respectively on the initial addressing coordinates of the plurality of cell terminal posts; and determining the positioning deviation values of the plurality of cell terminal posts based on the plurality of addressing images.

4. The pre-welding addressing method according to claim 3, wherein the controlling the three-axis addressing mechanism to drive the addressing camera module to acquire a plurality of addressing images corresponding to the plurality of cell terminal posts respectively at the initial addressing coordinates of the plurality of cell terminal posts comprises:
controlling the three-axis addressing mechanism to drive the addressing camera module to move, starting from initial addressing coordinates of a last cell terminal post of the battery pack and in a preset sequence, to initial addressing coordinates of a next cell terminal post so as to acquire an image of the next cell terminal post, such that the plurality of addressing images are finally obtained.

5. The pre-welding addressing method according to claim 3, wherein the addressing camera module comprises at least two addressing acquisition cameras; and
the controlling the three-axis addressing mechanism to drive the addressing camera module to acquire a plurality of addressing images corresponding to the plurality of cell terminal posts respectively at the initial addressing coordinates of the plurality of cell terminal posts comprises:
controlling a distance between visual centers of the two addressing acquisition cameras to be a standard distance between two cell terminal posts in the cell; and
controlling the three-axis addressing mechanism to drive the two addressing acquisition cameras to move, starting from initial addressing coordinates of two cell terminal posts in a last cell of the battery pack, to initial addressing coordinates of two cell terminal posts in a next cell so as to acquire images of the two cell terminal posts of the next cell, such that the plurality of addressing images are finally obtained.

6. The pre-welding addressing method according to claim 3, wherein the determining the positioning deviation values of the plurality of cell terminal posts based on the plurality of addressing images comprises:
determining first deviation values in an X-axis direction and second deviation values in a Y-axis direction between visual centers of the plurality of addressing images and centers of the cell terminal posts in the addressing images based on the addressing images, wherein the positioning deviation values comprise the first deviation values and the second deviation values.

7. The pre-welding addressing method according to claim 6, wherein the determining target addressing coordinates of the plurality of cell terminal posts based respectively on the initial addressing coordinates of the plurality of cell terminal posts and the positioning deviation values of the plurality of cell terminal posts comprises:
determining first coordinates of the plurality of cell terminal posts based respectively on the first deviation values of the plurality of cell terminal posts and first initial coordinates in the initial addressing coordinates;
determining second coordinates of the plurality of cell terminal posts based respectively on the second deviation values of the plurality of cell terminal posts and second initial coordinates in the initial addressing coordinates; and
determining the target addressing coordinates of the plurality of cell terminal posts based respectively on the first coordinates and the second coordinates of the plurality of cell terminal posts.

8. The pre-welding addressing method according to claim 1, wherein the pre-welding addressing system further comprises a jacking mechanism arranged on the frame body and the three-axis positioning mechanism arranged on the frame body, and the three-axis positioning mechanism comprises at least the fixing component; and after the target addressing coordinates of the cell terminal posts are determined, the pre-welding addressing method further comprises:

controlling the fixing component in the three-axis positioning mechanism to be disengaged from the positioning component of the battery pack; and controlling the jacking mechanism on the frame body to perform a first jacking action, in response to the fixing component being disengaged from the positioning component, so as to lower the to-be-addressed battery pack to a preset height and place the to-be-addressed battery pack onto a transport trolley.

9. A pre-welding addressing system, comprising at least: a frame body, a controller, a three-axis addressing mechanism, and an addressing camera module, wherein the three-axis addressing mechanism is mounted on the frame body and is capable of generating a movement relative to the frame body;

the addressing camera module is mounted on the three-axis addressing mechanism; the addressing camera module is movable relative to the frame body as driven by the three-axis addressing mechanism; and the controller is electrically connected to the three-axis addressing mechanism and is configured to: obtain product information of a to-be-addressed battery pack, in response to the to-be-addressed battery pack getting in position, wherein the battery pack comprises a plurality of cells, and the product information comprises initial addressing coordinates of a plurality of cell terminal posts; obtain positioning deviation values of the plurality of cell terminal posts based respectively on the initial addressing coordinates of the plurality of cell terminal posts, wherein the positioning deviation values of the cell terminal posts are determined based on addressing images of the cell terminal posts that are acquired by the addressing camera module; and determine target addressing coordinates of the plurality of cell terminal posts based respectively on the initial addressing coordinates of the plurality of cell terminal posts and the positioning deviation values of the plurality of cell terminal posts.

10. The pre-welding addressing system according to claim 9, wherein the three-axis addressing mechanism comprises:

a transverse addressing driving assembly arranged on the frame body and capable of generating a movement in a first direction relative to the frame body;

a longitudinal addressing driving assembly connected to the transverse addressing driving assembly and capable of generating a movement in a second direction relative to the frame body; and a vertical addressing driving assembly connected to the longitudinal addressing driving assembly and capable of generating a movement in a third direction relative to the frame body, the addressing camera module being fixed to the vertical addressing driving assembly, wherein there is an included angle between the first direction and the second direction, and both the first direction and the second direction are perpendicular to the third direction.

11. The pre-welding addressing system according to claim 10, wherein the pre-welding addressing system further comprises a jacking mechanism arranged on the frame body and the three-axis positioning mechanism arranged on the frame body, and the three-axis positioning mechanism comprises at least the fixing component;

the controller is further configured to control the fixing component in the three-axis positioning mechanism to be disengaged from the positioning component of the battery pack; and the jacking mechanism is configured to lower the to-be-addressed battery pack to a preset height and place the to-be-addressed battery pack onto a transport trolley, in response to the fixing component being disengaged from the positioning component.

12. The pre-welding addressing system according to claim 11, wherein the jacking mechanism comprises:

a jacking driving member with one end being connected to the frame body;

a jacking transmission member slidably connected to the frame body, with the other end of the jacking driving member being connected to the jacking transmission member; and a jacking beam slidably connected to the frame body and in transmission connection with the jacking transmission member, wherein the jacking transmission member is capable of driving the jacking beam to move in the third direction when the jacking driving member drives the jacking transmission member to move.

13. The pre-welding addressing system according to claim 9, wherein the pre-welding addressing system further comprises a three-axis positioning mechanism arranged on the frame body, and the three-axis positioning mechanism comprises at least a positioning driving assembly, a fixing component, and a positioning camera module, wherein the positioning driving assembly is arranged on the frame body, and the positioning driving assembly is electrically connected to the controller;

the fixing component is arranged on the positioning driving assembly;

the positioning camera module is arranged on the positioning driving assembly at a position aligned with the fixing component; the positioning driving assembly is configured to drive the fixing component and the positioning camera module to move;

the controller is further configured to control the three-axis positioning mechanism to move to a first preset position based on the product information;

the positioning camera module is configured to acquire an image of a positioning component of the battery pack at the first preset position; and the controller is further configured to: obtain a positioning deviation value, between the positioning component and a preset reference point, determined based on the acquired positioning image; and control the three-axis positioning mechanism to drive the fixing component to the positioning component based on the positioning deviation value between the positioning component and the preset reference point so as to fix the battery pack to the frame body by the fixing component.

14. The pre-welding addressing system according to claim 13, wherein the positioning driving assembly comprises:
- a transverse positioning driving assembly arranged on the frame body and capable of generating a movement in the first direction relative to the frame body;
- a longitudinal positioning driving assembly connected to the transverse positioning driving assembly and capable of generating a movement in the second direction relative to the frame body; and
- a vertical positioning driving assembly connected to the longitudinal positioning driving assembly and capable of generating a movement in the third direction relative to the frame body, both the positioning camera module and the fixing component being fixed to the vertical positioning driving assembly, wherein
- there is an included angle between the first direction and the second direction, and both the first direction and the second direction are perpendicular to the third direction.

15. The pre-welding addressing system according to claim 9, wherein
- the addressing camera module is further configured to acquire a plurality of addressing images corresponding to the plurality of cell terminal posts respectively at the initial addressing coordinates of the plurality of cell terminal posts, and determine the positioning deviation values of the plurality of cell terminal posts based on the plurality of acquired addressing images;
or
- the controller is further configured to: obtain a plurality of addressing images corresponding to the plurality of cell terminal posts acquired by the addressing camera module, based respectively on the initial addressing coordinates of the plurality of cell terminal posts; and determine the positioning deviation values of the plurality of cell terminal posts based on the plurality of addressing images.

16. The pre-welding addressing system according to claim 9, wherein the addressing camera module comprises at least two addressing acquisition cameras;
- the controller is further configured to control a distance between visual centers of the two addressing acquisition cameras to be a standard distance between two cell terminal posts in the cell;
- the controller is further configured to control the three-axis addressing mechanism to drive the two addressing acquisition cameras to move, starting from initial addressing coordinates of two cell terminal posts in a last cell of the battery pack, to initial addressing coordinates of two cell terminal posts in a next cell; and
- the two addressing acquisition cameras are configured to acquire images of the two cell terminal posts of the next cell, such that the plurality of addressing images are finally obtained.

* * * * *